US006665707B1

(12) United States Patent
Bates et al.

(10) Patent No.: US 6,665,707 B1
(45) Date of Patent: *Dec. 16, 2003

(54) GROUPWARE ENVIRONMENT THAT ADAPTIVELY TAILORS OPEN MICROPHONE SESSIONS BASED ON PARTICIPANT LOCALITY

(75) Inventors: Cary Lee Bates, Rochester, MN (US); Brian John Cragun, Rochester, MN (US); Byron Timothy Watts, Byron, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1277 days.

(21) Appl. No.: 08/773,813
(22) Filed: Dec. 19, 1996
(51) Int. Cl.⁷ .............................................. G06F 15/16
(52) U.S. Cl. ...................................... 709/204; 709/203
(58) Field of Search ........................... 395/200.34, 332; 348/14, 15, 16; 709/204, 205, 219, 203

(56) References Cited

U.S. PATENT DOCUMENTS

| 4,330,690 | A |   | 5/1982  | Botros .................... 179/81 A |
| 4,672,674 | A |   | 6/1987  | Clough et al. ................. 381/71 |
| 5,027,393 | A |   | 6/1991  | Yamamura et al. ......... 379/410 |
| 5,363,507 | A |   | 11/1994 | Nakayama et al. ......... 395/800 |
| 5,491,743 | A | * | 2/1996  | Shiio et al. ............. 395/200.34 |
| 5,861,883 | A | * | 1/1999  | Cuomo et al. ............... 345/326 |
| 5,862,330 | A | * | 1/1999  | Anupam et al. ............ 709/204 |
| 5,890,177 | A | * | 3/1999  | Moody et al. .............. 707/511 |

OTHER PUBLICATIONS

Vin et al., "Multimedia Conferencing in the Etherphone Environment", IEEE, pp. 69–79, Oct. 1991.*
Kobayashi et al., "Virtual Conferencing Room: AMetaphor for Multi–User Real–Time Conferencing Systems", IEEE, pp. 430–435, Jul. 1993.*
IBM Technical Disclosure Bulletin, vol. 36, Comerford et al., Oct. 1993, "Using the Workstation for Real Time Voice Communication," pp. 287–288.
Inspec Abstract No. 4213760, from Maeno et al., 1991, "Distributed Desktop Conferencing System (MERMAID) Based on Group Communication Architecture."
Inspec Abstract NO. 4794267, from C. Stapleton, 1992, "Network Activity Stages: Organization of Successful Electronic Collaboration and Communications."

* cited by examiner

*Primary Examiner*—Zarni Maung
(74) *Attorney, Agent, or Firm*—Steven W. Roth

(57) ABSTRACT

The mechanisms of the present invention model real life by providing subconversations through several different, yet complimentary, features. One feature is referred to as conversation separation. When enabled by a user, conversation separation is used to create subconversations by identifying groups of users that are speaking with one another. Another user configurable feature is referred to as distance recognition. Distance recognition creates subconversations by considering the logical distance between users within a groupware object. A feature that is related to distance recognition is referred to as "priority conversation." If enabled, priority conversation maintains a user within a subconversation as the user moves away from the location of the other users so long as the user that is moving away continues to participate in the subconversation.

39 Claims, 42 Drawing Sheets

PC normalizer 351 separator 352 separation normalizer 353 hear-list refresher 354 control block manager 355 packet queue manager 356 voice packet player 357 user command processor 358 auto squelch normalizer 359 hear calculator 361

FIG. 3B

User Specific Control Information

| 0 | 1 | 2 | 3 | 4 | PCF | CSF |
|---|---|---|---|---|-----|-----|

0 — never hear —602
1 — always hear —604
2 — never hear me —606
3 — always hear me —608
4 — heard —610
PCF — Priority Conversation Factor —612
CSF — Conversation Separation Factor —614

FIG. 6B

Message Format

| msg. id. | data |
|---|---|

Messages

| | | | |
|---|---|---|---|
| hear | 0 | sender proc. id. | target proc. id. |

| | | | |
|---|---|---|---|
| not hear | 1 | sender proc. id. | target proc. id. |

| | | | |
|---|---|---|---|
| always hear | 2 | effected proc. id. | subject of proc. id. |

| | | | |
|---|---|---|---|
| never hear | 3 | effected proc. id. | subject of proc. id. |

| | | | | |
|---|---|---|---|---|
| reset user | 4 | effected proc. id. | subject of proc. id. | flg. |

| | | |
|---|---|---|
| send state | 5 | data port of receiver |

FIG. 7A

Messages Continued

| | | |
|---|---|---|
| done sending | 6 | |
| join request | 7 | proc. id. / object name / ports |
| exit | 8 | proc. id. |
| state | 9 | data : (object and CCB) |
| no state | 10 | |
| joined | 11 | CCB table entry |
| voice packet | 12 | sender proc. id. / data |
| voice start | 13 | sender process id. |
| voice end | 14 | sender process id. |

FIG. 7B

Messages Continued

| hear? | 15 | sender process id. |
|---|---|---|

| run | 16 | |
|---|---|---|

| start | 17 | |
|---|---|---|

| end | 18 | |
|---|---|---|

| display user list | 19 | |
|---|---|---|

FIG. 7C

GROUPWARE ENVIRONMENT THAT ADAPTIVELY TAILORS OPEN MICROPHONE SESSIONS BASED ON PARTICIPANT LOCALITY

FIELD OF THE INVENTION

The present invention relates to data processing systems. More particularly, the present invention relates to groupware environments.

BACKGROUND OF THE INVENTION

The use and popularity of computer systems has seen a steady increase since around the middle of the twentieth century. This trend has been fueled by many different advances in computer system technology (e.g., the invention of random access memory in the 1950s and the introduction of the personal computer in the 1980s). One of the more recent advances in computer system technology is called groupware.

Groupware, which is also sometimes called collaborative computing or collaborative information processing, generally involves specialized computer system technology that is designed to promote efficiency by helping groups of computer users work together to achieve a common goal. While groupware can involve differing pieces of computer system technology, this patent involves a computer program (software) that allows controlled access to a single work product by multiple users. This type of software is sometimes called group-writing software. A good example of the use of group-writing software is its use for the joint production of a new text book. Multiple users simultaneously work together to make changes and additions to the book during production. The changes and additions, which can be in the form of text, graphics, and/or photographs, are instantaneously made available to each member of the team. The group-writing software is used to control each team member's access to the book while informing the other team members of what changes are being made so that they can best coordinate their joint effort. (We use the term collaborative users to describe the users that work together on a joint work product.)

Just as there have been advances in computer system technology, there have also been advances in groupware technology. One such advance is the use of telephone equipment to allow collaborative users to discuss the joint product as they work. The discussion is typically carried out via a conference call that is controlled by the group-writing software. While the combination of conference call technology with groupware provides an intuitive advantage to collaborative users, current groupwriting software of this type has one significant shortcoming. This being that current group-writing software does not control (or provide the ability to control) what each user is able to hear. Every user hears every other user, no matter whether such communication is necessary or appropriate. This "everyone talking at once" environment is not only annoying, but it amounts to a serious efficiency problem. At the core of this problem is the fact that today's conference call-based, group-writing software does not accurately model real life. When team members discuss a joint project, they may well occasionally do so as a team, but more often than not, team members end up discussing the joint project in smaller groups (e.g., two, three, etc.). Current group-writing software, however, forces its users to participate in a single conversation, even at times when it would be more efficient to work together and converse in smaller groups.

Groupware technology will never fully realize its potential without a groupware mechanism that better approximates how teams naturally collaborate to accomplish a common goal.

SUMMARY OF THE INVENTION

The groupware mechanism of the present invention is primarily composed of two elements, a groupwriter daemon and one or more groupwriter client processes. The groupwriter daemon can be thought of as a server process, while the groupwriter client processes (as their name suggests) can be considered clients relative to the groupwriter daemon.

The groupwriter daemon handles user requests to join one of the groupware sessions for which it is responsible. There is one groupware session for each groupware object (e.g., a document or other object) that is currently being worked on by a set of collaborative users. The groupwriter daemon also routes voice and data messages between client processes. The client processes, meanwhile, are responsible for providing the subconversation capabilities of the present invention, and for providing users with control over the subconversations. We use the term subconversation to refer to conversations that take place between subsets of collaborative users that are working on a particular groupware object.

The mechanisms of the present invention model real life by providing these subconversations through several different, yet complimentary, features. One feature is referred to as conversation separation. When enabled by a user, conversation separation is used to create subconversations by identifying groups of users that are speaking with one another. Another user configurable feature is referred to as distance recognition. Distance recognition creates subconversations by considering the logical distance between users within a groupware object. For example, if users A, B, and C are all editing the same general portion of a document, the present invention assumes that the three users will want to be able to talk with one another. Of course, the opposite is true where users are not close to one another within the object. A feature that is related to distance recognition is referred to as "priority conversation." If enabled, priority conversation maintains a user within a subconversation as the user moves away from the location of the other users so long as the user that is moving away continues to participate in the subconversation.

In addition to providing the above-mentioned automatic features, the present invention also allows the user to override these automatic features through explicit user control and to see which other users are able to hear them (i.e., via presentation of a "hear list").

BRIEF DESCRIPTION OF THE DRAWINGS

FIG. 3B is a block diagram of the auxiliary processes that are used in the preferred embodiment of the present invention.

FIG. 6B is a block diagram of the user specific control information that is used in the client control block of the preferred embodiment of the present invention.

FIGS. 7A through 7C are diagrams that show the message format and messages used in the preferred embodiment of the present invention.

DESCRIPTION OF THE PREFERRED EMBODIMENT

Figure 1:
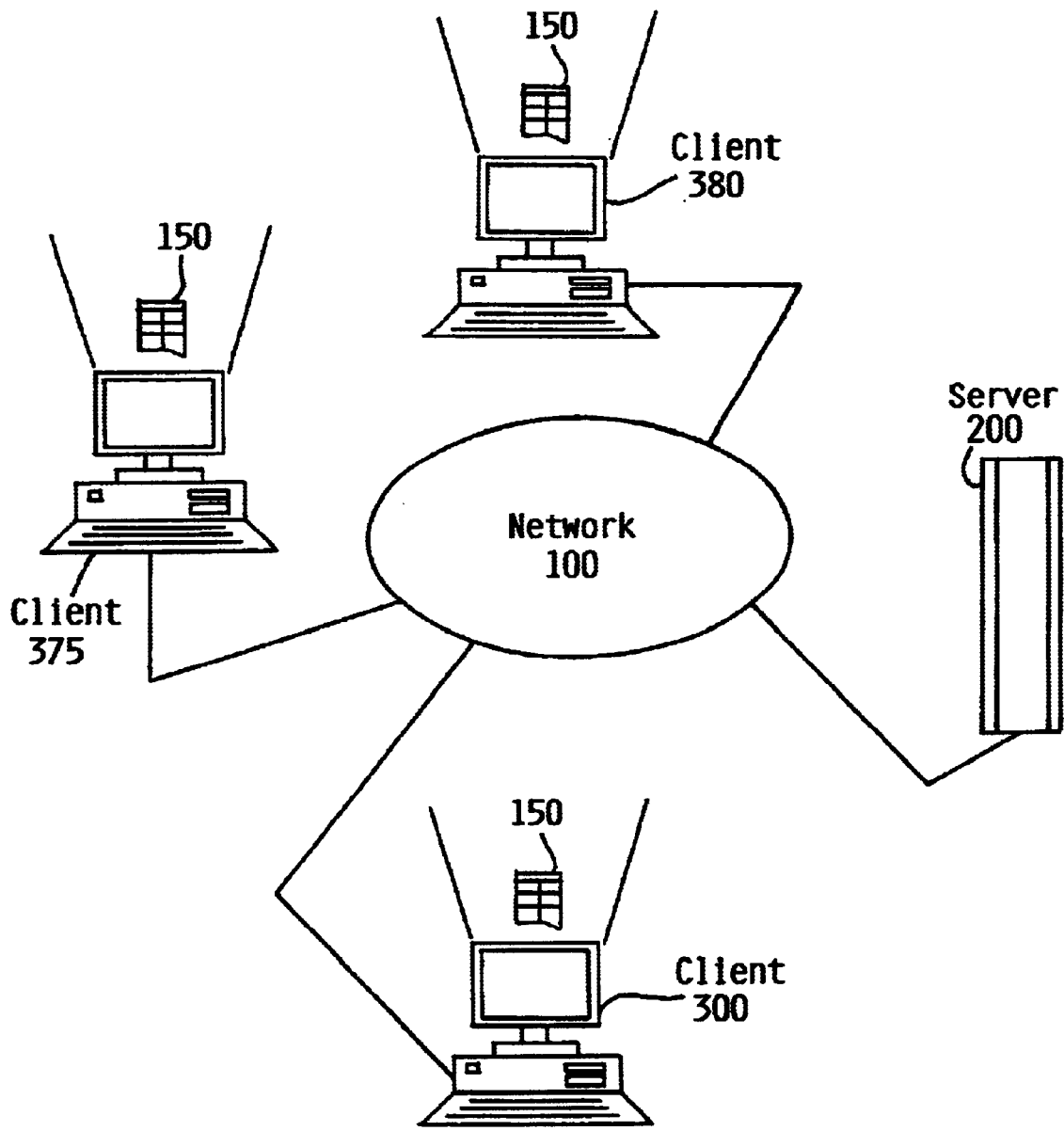
FIG. 1 is a block diagram of the network that is used in the preferred embodiment of the present invention.

Turning now to the drawings, FIG. 1 shows a diagram of network 100, which is the network used in the preferred embodiment of the present invention. Network 100 is comprised of a single server, server computer 200, and several client workstations (i.e., clients 300, 375, and 380). Those skilled in the art will appreciate that the present invention is not limited to any one network or to any one network configuration. FIG. 1 also shows object 150 simultaneously residing on each workstation such that it can be viewed and/or edited by users that are working at the client workstations. This simultaneous access to object 150 is provided by the groupware environment of the present invention. Further information about the innerworkings of the groupware environment of the present invention is provided in the paragraphs that follow.

Figure 2:
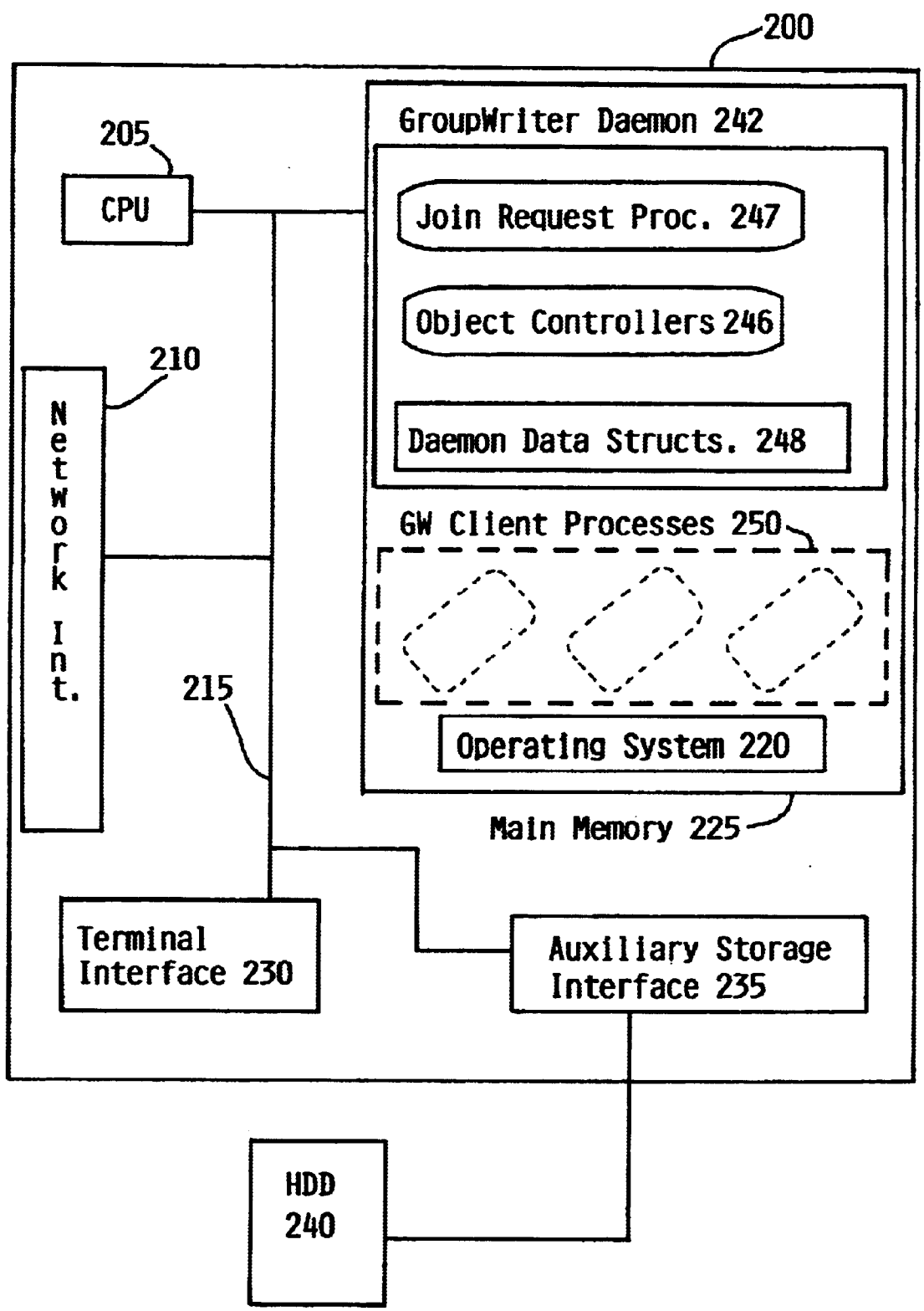
FIG. 2 is a block diagram of the server computer system that is used in the preferred embodiment of the present invention.

FIG. 2 is a block diagram that shows further details of server 200. Server 200 is an enhanced IBM AS/400 computer system; however, those skilled in the art will appreciate that the mechanisms and apparatus of the present invention are not limited to the particular type system used in the preferred embodiment. As shown, server 200 comprises main or central processing unit (CPU) 205, which is connected to main memory 225, terminal interface 230, auxiliary storage interface 235, and network interface 210. These system components are interconnected through the use of system bus 215. Auxiliary storage interface 235 is used to connect mass storage devices ( such as Hard Disk Drive 240) to server 200.

Server 200 utilizes well-known virtual addressing mechanisms that allow its programs to behave as if they only have access to a large, single storage entity (i.e., instead of access to multiple, smaller storage entities such as main memory 225 and HDD 240). Therefore, while groupwriter daemon 242, client processes 250, and operating system 220 are shown to reside in main memory 225, those skilled in the art will recognize that these programs are not necessarily all completely contained in main memory 225 at the same time. For example, portions of operating system 220 will reside in main memory 225 while executing on CPU 205, but will at other times reside on HDD 240. (It should also be noted that the term "computer system memory" is used herein to generically refer to the entire virtual memory of the computer system at issue.)

Groupwriter daemon 242 is further shown to contain join request processor 247, object controllers 246, and daemon data structures 248. Join request processor 247 is explained in detail in the text associated with FIG. 17, while object controllers 246 are explained in the text associated with FIG. 18. Daemon data structures 248 are described in the text associated with FIG. 4A.

Groupwriter client processes 250, which are described in the subsequent pages, are shown in main memory 225 of server 200 to point out that the present invention is capable of being practiced on a single computer system. In other words, even though the present invention is primarily described in this patent in the context of a client-server environment, the scope of the invention is not be limited to such an environment.

Operating system 220 is a multitasking operating system, known in the industry as OS/400; however, those skilled in the art will appreciate that the spirit and scope of the present invention is not limited to any one operating system.

The interfaces (called input/output processors in AS/400 terminology) that are used in the preferred embodiment each include separate, fully programmed microprocessors that are used to off-load compute-intensive processing from CPU 205. However, those skilled in the art will appreciate that the present invention applies equally to computer systems that simply use I/O adapters to perform similar functions.

Terminal interface 230 is used to directly connect one or more terminals to server 200. These terminals, which may be non-intelligent or fully programmable workstations (e.g., such as those known in today's nomenclature as "network stations" or "thin clients"), are used to allow system administrators and users to communicate with server 200. Network interface 210 is another means by which other computer systems and/or workstations can be connected to server 200 (i.e., in network fashion). It should be noted that the present invention applies equally no matter the exact connection mechanism that is used. Server 200 may be connected to other computer systems and/or workstations regardless of whether the connection(s) is made using present-day analog and/or digital techniques or via some networking mechanism of the future.

It is also important to point out that the presence of terminal interface 230 and network interface 210 means that server 200 may engage in cooperative processing with one or more other computer systems or workstations. Of course, this in turn means that the programs shown in main memory 225 need not necessarily all reside on server 200.

Figure 3A:
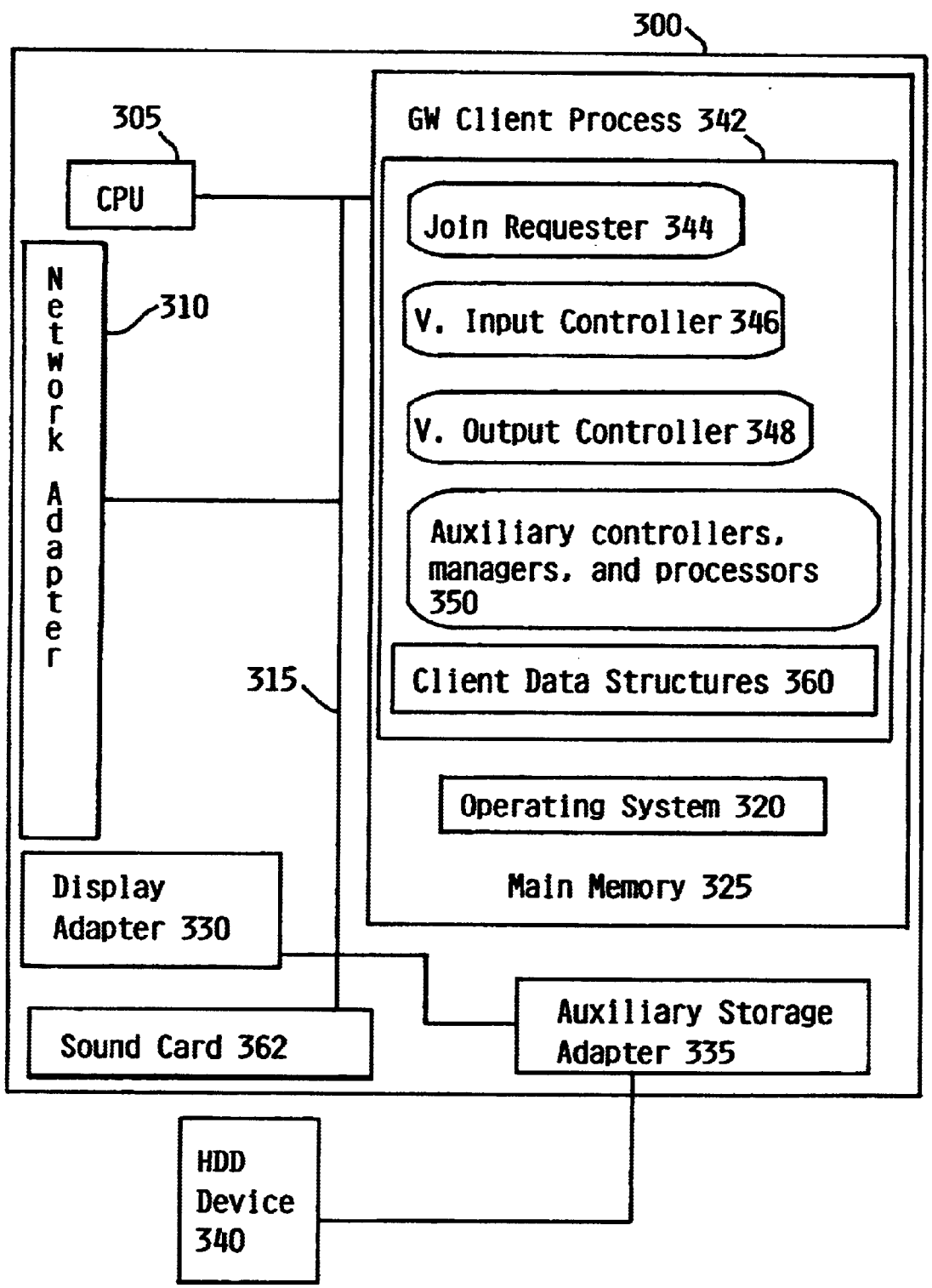
FIG. 3A is a block diagram of the client computer system that is used in the preferred embodiment of the present invention.

FIG. 3A is a block diagram that shows further details of client 300. Since much of the components of client 300 are very similar to those of server 200, only the differences between the two machines will be described here (i.e., to avoid repetition).

Client 300 is an enhanced IBM Personal Computer 350 P100; however, as described above client 300 could also be a network computer connected to terminal interface 230 of server 200. As shown, client 300 comprises main or central processing unit (CPU) 305, which is connected to main memory 325, display adapter 330, auxiliary storage adapter 335, sound card 362, and network adapter 310. These system components are interconnected through the use of system bus 315. Auxiliary storage adapter 335 is used to connect mass storage devices (such as Hard Disk Drive 340) to client 300.

As shown, main memory 325 contains groupwriter client process 342 and operating system 325.

Groupwriter client process 342 is one of client processes 250, which as previously mentioned may reside on server 200 or on a client device such as client 300. GroupWriter client process 342 is further shown to comprise join requester 344, voice input controller 346, voice output controller 348, auxiliary controllers, managers, and processors 350, and client data structures 360. Join requester is described in the text associated with FIG. 16. Voice input controller 346 is described in the text associated with FIG. 23 and voice output controller 348 is described in the text associated with FIG. 21. Auxiliary controllers, managers, and processors 350 are shown on FIG. 3B. We again point out here that the programs shown in main memory 325 need not necessarily all simultaneously reside in main memory 325, or even on client 300 for that matter. Indeed, this latter scenario would likely be the case if client 300 were a network computer, and therefore, be dependent upon an on-demand shipping mechanism. Client data structures 360 are described in the text associated with FIGS. 4B and 6A and 6B. When taken together, groupware client process 342 and its internal data structures present the user with a groupware environment (i.e., that which is seen and/or heard by the user). It should be understood that other groupware environment mechanisms may not have the same or similar structure as that defined in the preferred embodiment, yet nevertheless still fall within the spirit and scope of the present invention.

Operating system 320 is a multitasking operating system known in the industry as OS/2; however, those skilled in the art will appreciate that the spirit and scope of the present invention is not limited to any one operating system.

Display adapter 330 is used to directly connect a display device to client 300. Network adapter 310 is used to connect client 300 to server 200. In the case of the preferred embodiment, this connection is between network adapter 310 and network interface 210 of server 200. If client 300 had been one of the so-called "thin client" computer systems (e.g., such as the IBM Network Station) the connection would be between network adapter 310 and terminal interface 230 of server 200.

Sound card 362 is used to receive voice messages from the microphone (not shown) for transmission to the other groupware client processes and from the network for transmission to the user of client 300 (i.e., through speakers, which are also not shown). It should be noted here that the notion of an "open microphone" conversation is used herein to refer to conversations between two or more individuals that take place in much the same way as that which is facilitated by participating in a conference call or by having "party line" telephone service.

FIG. 3B lists auxiliary controllers, managers, and processors 350. Priority conversation normalizer 351 is described in the text associated with FIG. 27. Separator 352 is described in the text associated with FIG. 22. Separation normalizer 353 is described in the text associated with FIG. 28. Hear-list refresher 354 is described in the text associated with FIG. 20. Control block manager 355 is described in the text associated with FIGS. 19A and 19B. Packet queue manager 356 is described in the text associated with FIG. 24. Voice packet player 357 is described in the text associated with FIGS. 25A and 25B. User command processor 358 is described in the text associated with FIG. 15. Auto squelch normalizer 359 is described in the text associated with FIG. 29. Hear calculator 361 is described in the text associated with FIG. 26.

As a final preliminary matter, it is important to note that while the present invention has been (and will continue to be) described in the context of fully functional computer systems, that those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks and CD ROMs and transmission type media such as digital and analogue communications links.

Figure 4A:
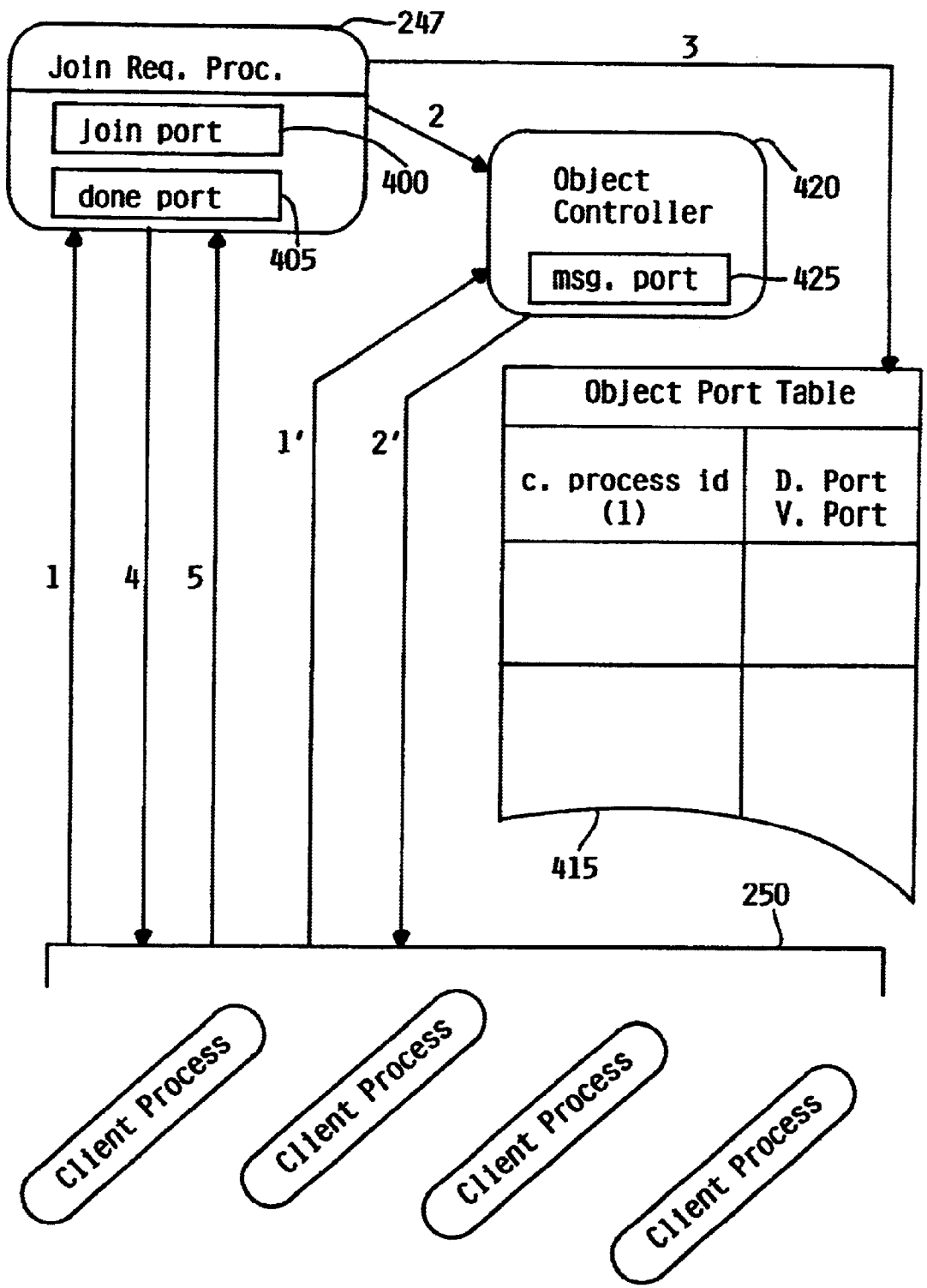
FIG. 4A is a diagram that shows the high level processing of the join request handling of the preferred embodiment of the present invention.

FIG. 4A shows the high level process flow of the join request processing of the present invention. When a user indicates that they want to work with a groupware object, their client process contacts join request processor 247 of the groupwriter daemon 242. This contact is made through join port 400 [see step 1]. Join port 400 is a port that is "well-known" to each one of client processes 250. For the purposes of explanation, assume here that the subject client process, referred to here as client 1, is the first to request access to the specified groupware object. In step 2, join request processor 247 will start an object controller to handle events from client processes that pertain to the subject groupware object. In step 3, join request processor 247 creates an object port table for the subject groupware object and creates an entry for the requesting client process. The table includes one entry for each client process that is currently working with the groupware object (i.e., just one in this initial case). Each entry includes the client process identifier and the voice and data ports being monitored by the associated client process. Once the object controller has been started and the table created, the client process is instructed to proceed with display of the groupware object [step 4]. The client process responds by 1) initializing certain internal data structures (discussed on forthcoming pages) and 2) retrieving the groupware object for display to (and access by) the requesting user.

Assume now that a second user wants to work with the subject groupware object. The client process for the second user, referred to here as client process 2, responds to the user's request by contacting join request processor 247 via join port 400. Knowing that an object controller exists for the subject object, join request processor 247 suspends the object controller [step 2] and adds the requesting client process to the object port table for the object [this occurs in step 3 though an additional entry is not shown]. In step 4, join request processor 247 instructs one of the other client processes (i.e., client process 1 in this case) to send the current state of the groupware object to the requesting client process (i.e., client process 2). When client process 1 has finished sending the current state of the object to client process 2, it informs join request processor 247 of this completion via done port 405. Done port 405 is another port that is "well-known" to each of client processes 250. Henceforth, each user event that affects the groupware object (e.g., an edit event of some type) is passed to the object controller for distribution to the other client processes. In our example, for instance, a user edit event from the user of client process 2 would be forwarded to the object controller by client 2 [step 1']. The object controller would then use the data port information in the object port table to route the event to all the client processes.

Figure 4B:
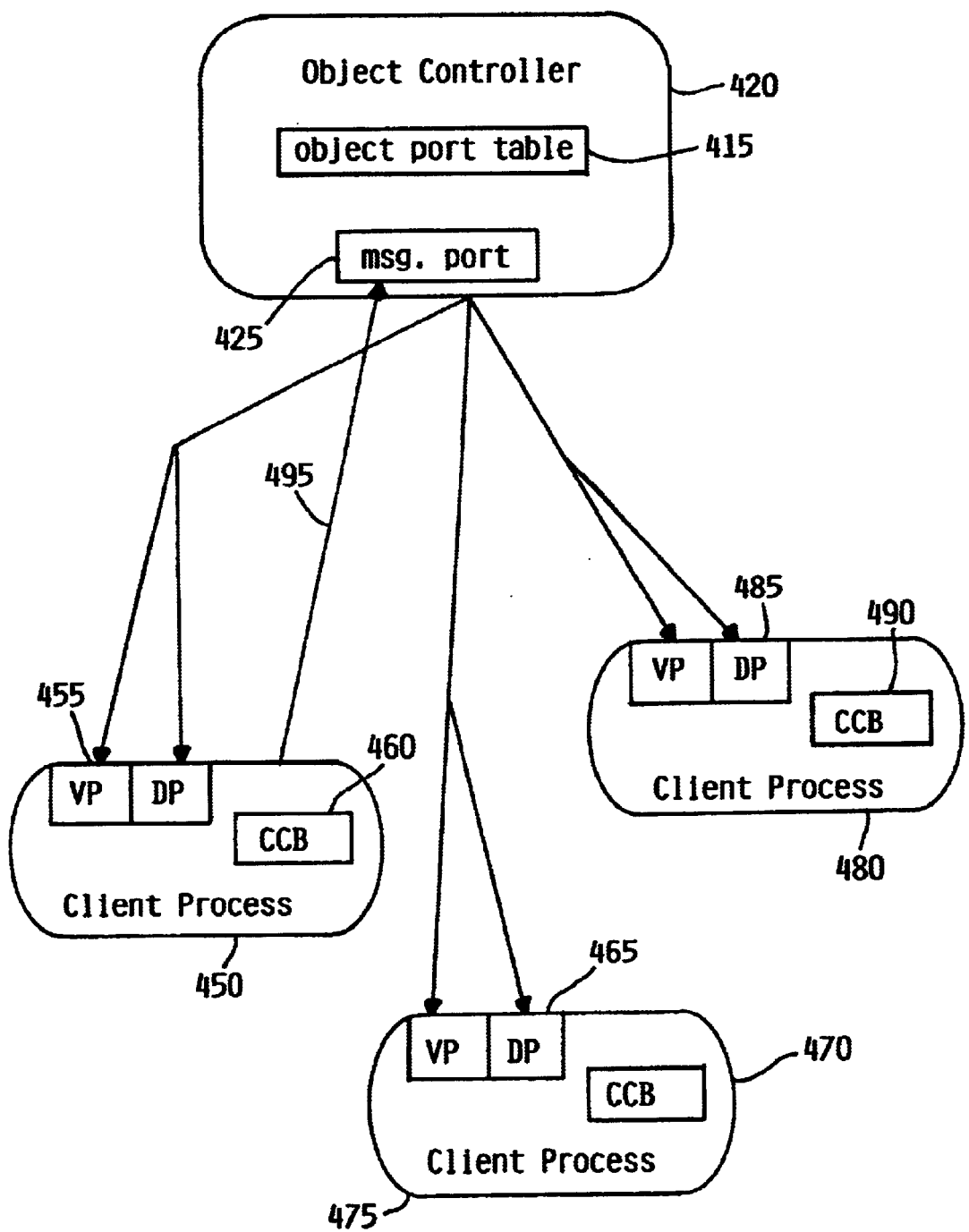
FIG. 4B is a diagram that shows the high level processing of the message passing of the preferred embodiment of the present invention.

FIG. 4B shows the high level process flow of the basic message processing of the present invention. As has been previously mentioned, each of groupwriter client processes 250 has an associated voice port and a data port. Each of groupwriter client processes 250 also has an associated client control block, which will be explained in further detail in the text associated with FIGS. 6A and 6B. When a groupwriter client process sends a message (voice or data), it sends the message to its object controller. The object controller is then responsible for relaying the message to each groupwriter client processes. For example, consider groupwriter client process 450. When groupwriter client process 450 sends a message (e.g., message 495), it sends the message to message port 425 of object controller 420. Object controller 420 then relays the message to the voice or data port of all groupwriter client processes shown (i.e., processes 475 and 480).

The mechanism in groupwriter client process 450 that sends out data messages is user command processor 358, while the mechanism that sends out voice messages is voice output controller 348. Please respectively reference FIGS. 15 and 21 (and the accompanying text) for more information about these mechanisms. The mechanism in groupwriter client processes 475 and 480 that processes incoming data messages is control block manager 355, while the mechanism that processes incoming voice messages is voice input controller 348. Please respectively reference FIGS. 19A and B and 23 (and the accompanying text) for more information about these mechanisms.

Figure 5:
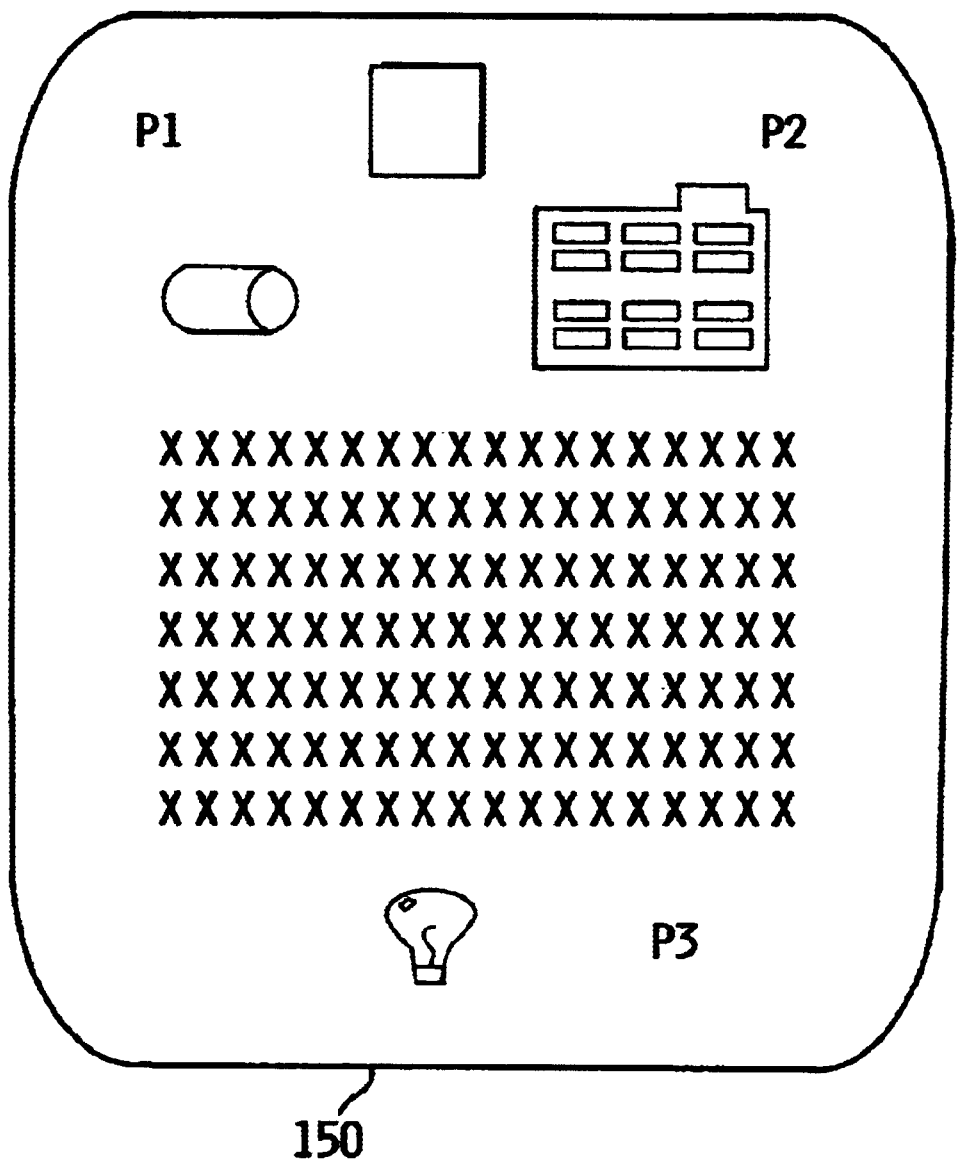
FIG. 5 is a diagram that shows the object that is used in the preferred embodiment of the present invention.

FIG. 5 is a diagram that shows the object used in the preferred embodiment. As shown, object 150 contains a mix of text and graphics. It should be noted, though, that the present invention is not limited to any one type of object. Other object types, such as circuit diagrams, spreadsheets, or video or audio presentations, could also be used. The only limitation imposed by the present invention is that the object be capable of being simultaneously displayed and/or manipulated by more than one user. Also shown within object 150 are positions P1, P2, and P3. These positions are used here to illustrate how the concept of distance is used within the present invention. When the term distance is used herein it is intended to refer to the distance between two user locations within an object such as object 150. For example, the distance between a first user's cursor at P1 and a second user's cursor at P2 is different than the distance between the first user's cursor position and a third user's cursor position at P3. In the preferred embodiment, distance is calculated based on pages and lines (i.e., since the object at issue is characterized in those terms); however, it should be noted that the calculation of distance depends upon the particular type of object involved. Accordingly, details on distance calculation for other object types are not provided here. The present invention depends only upon the ability to obtain distance information, not upon how that distance information is actually obtained.

It should be noted here that in the context of a discussion about distance and location, the terms user, groupwriter client process, and client process are used interchangeably throughout this patent.

Figure 6A:
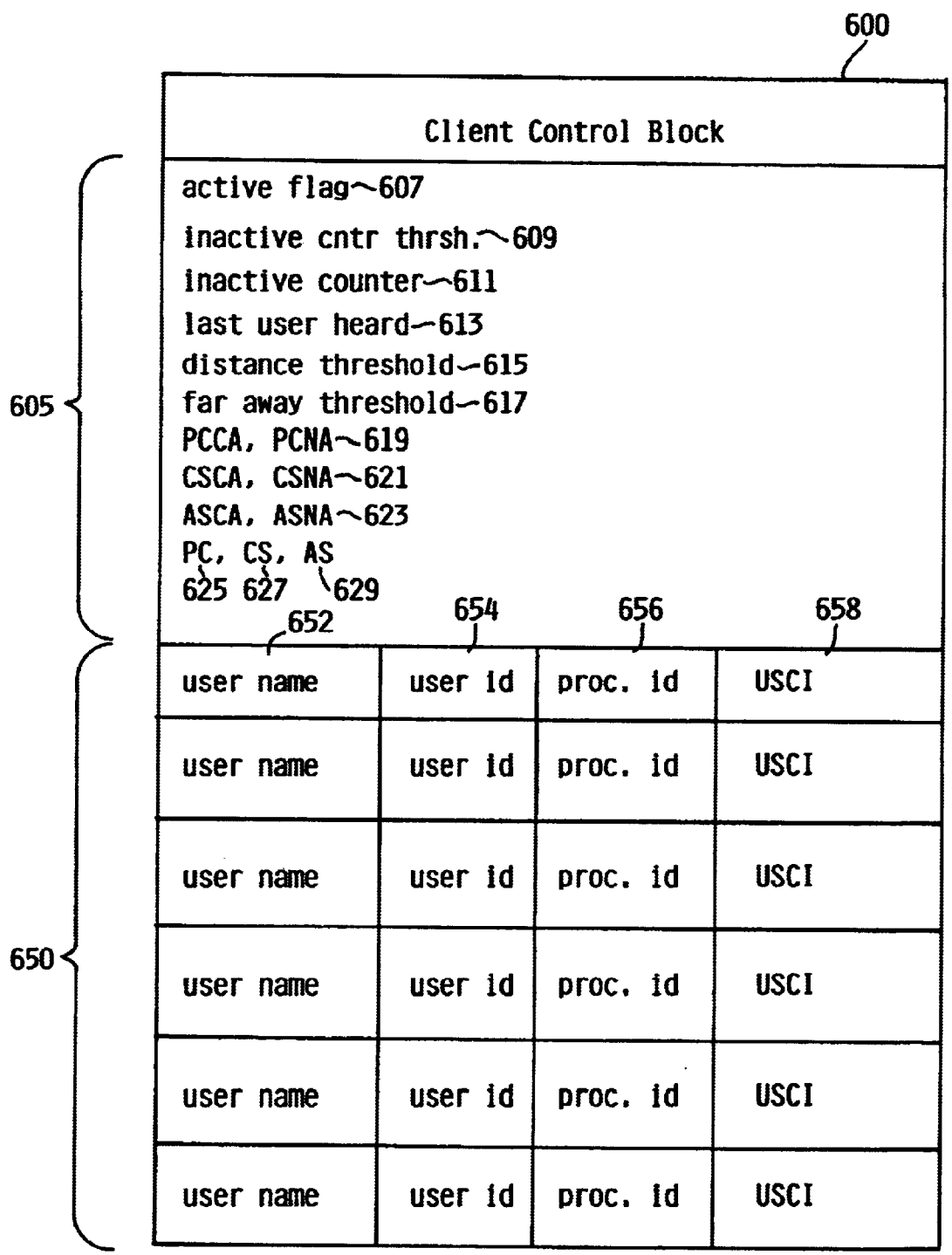
FIG. 6A is a block diagram of the client control block that is used in the preferred embodiment of the present invention.

FIG. 6A shows client control block 600, constructed in accordance with the preferred embodiment of the present invention. Client control block 600, which comprises header 605 and user entries 650, is used by groupwriter client processes to control the groupware environment for its user. Header 605 contains information that is primarily used to by the groupwriter client process to make adjustments that apply to the client as a whole; whereas entries 650 are primarily used to allow the user to specify relationships that he or she is to have with other users. For the most part the adjustments made via the information stored in header 605 happen more or less automatically, while the adjustments that are made via the information stored in entries 650 do not take place without being specified by the user. (It should be noted that user preferences supersede automatic adjustments when conflicts occur.)

Active flag 607, inactive counter threshold 609, and inactive counter 611 are used in the preferred embodiment to determine when a user has finished verbalizing a thought. This aspect of the preferred embodiment is explained in more detail in the text associated with FIG. 21. Last user heard 613 is used in the preferred embodiment to identify the last user heard for the purposes of the priority conversation and conversation separation facilities. This feature is explained in more detail in the text associated with FIGS. 21–23. Distance threshold 615 is used in the preferred embodiment to provide distance recognition within the groupware environment. Distance threshold 615, which is explained in greater detail in the text associated with FIG. 23, can be thought of as the radius of a circle that represents the range (logical distance) that one user can hear another user. Far away threshold 617 is used in the preferred embodiment to reduce the volume of a user as that user approaches distance threshold 615, so that other users know that the subject user is getting further and further away. This latter facility of the present invention is referred to herein as the "quiet packet" facility.

PCCA and PCNA 619, which are acronyms that respectively stand for "priority conversation compensation amount" and "priority conversation normalization amount," are used within the preferred embodiment to enable certain aspects of the priority conversation facility of the present invention. The priority conversation facility; which is explained in further detail in the text associated with FIGS. 21, 23, and 27; is used to maintain conversations that are in progress, even though one of the participants has moved outside distance threshold 615. CSCA and CSNA 621, which are acronyms that respectively stand for "conversation separation compensation amount" and "conversation separation normalization amount," are used within the preferred embodiment to enable certain aspects of the conversation separation facility of the present invention. The conversation separation facility; which is explained in further detail in the text associated with FIGS. 21, 22, and 28; identifies and maintains certain conversations by filtering out discussion that is not part of the subject conversation. ASCA and ASNA 623, which respectively stand for auto squelch compensation amount" and "auto squelch normalization amount," are used within the preferred embodiment to enable certain aspects of the auto squelch facility of the present invention. The auto squelch facility is used in the preferred embodiment to reduce distance threshold 615 when too many users (i.e., that are within range) are talking at the same time. This facility is explained in more detail in the text associated with FIGS. 24 and 29. PC 625, CS 627, and AS 629 are respectively used to turn-on the priority conversation, conversation separation, and auto squelch facilities.

(It should be noted here that PCCA, PCNA 619; CSCA, CSNA 621; ASCA, ASNA 623 are all configurable distance values that need to be tuned for each environment. Those skilled in the art will understand that the exact choice of these values is a configuration decision that can greatly impact the performance and behavior of the preferred embodiment, but that nevertheless does not bear on the spirit or scope of the present invention.)

User entries 650 are made up of user name 652, user id. 654, proc id. 656, and user specific control information (USCI) 658. User name 652 and user id. 654 are used to identify other users to the user of groupwriter client process 342 (i.e., the user being presented the groupware environment that is represented by the subject client control block). Process id. 656 is used by the mechanisms of the preferred embodiment to identify different instances of groupwriter client process 342. USCI is explained in the text associated with FIG. 6B.

Turning now to FIG. 6B, USCI comprises never hear flag 602, always hear flag 604, never hear me flag 606, always hear me flag 608, heard flag 610, priority conversation factor 612, and conversation separation factor 614. When set, never hear flag 602 is used to always prevent the user of the subject groupwriter client process from hearing the user that is represented by the specific entry. When set, always hear flag 604 is used to always ensure that the user of the subject groupwriter client process hears the user that is represented by the specific entry. When set, never hear me flag 606 is used to show the user of the subject groupwriter client process that the user represented by the specific entry will never hear them. When set, always hear me flag 606 is used to show the user of the subject groupwriter client process that the user represented by the specific entry will always hear them.

Heard flag 610 is used along with CSF 614, CSCA and CSNA 621 to provide certain enabling requirements of the conversation separation facility of the present invention. PCF 612 is used along with PCCA and PCNA 619 to provide certain enabling requirements for the priority conversation facility of the present invention. These two facilities are discussed in further detail in the text associated with FIGS. 21 and 23.

FIGS. 7A through 7C show the message format and messages used in the preferred embodiment. The individual messages are explained in context in connection with the forthcoming diagrams; therefore, individualized treatment is not provided here.

Figure 8:
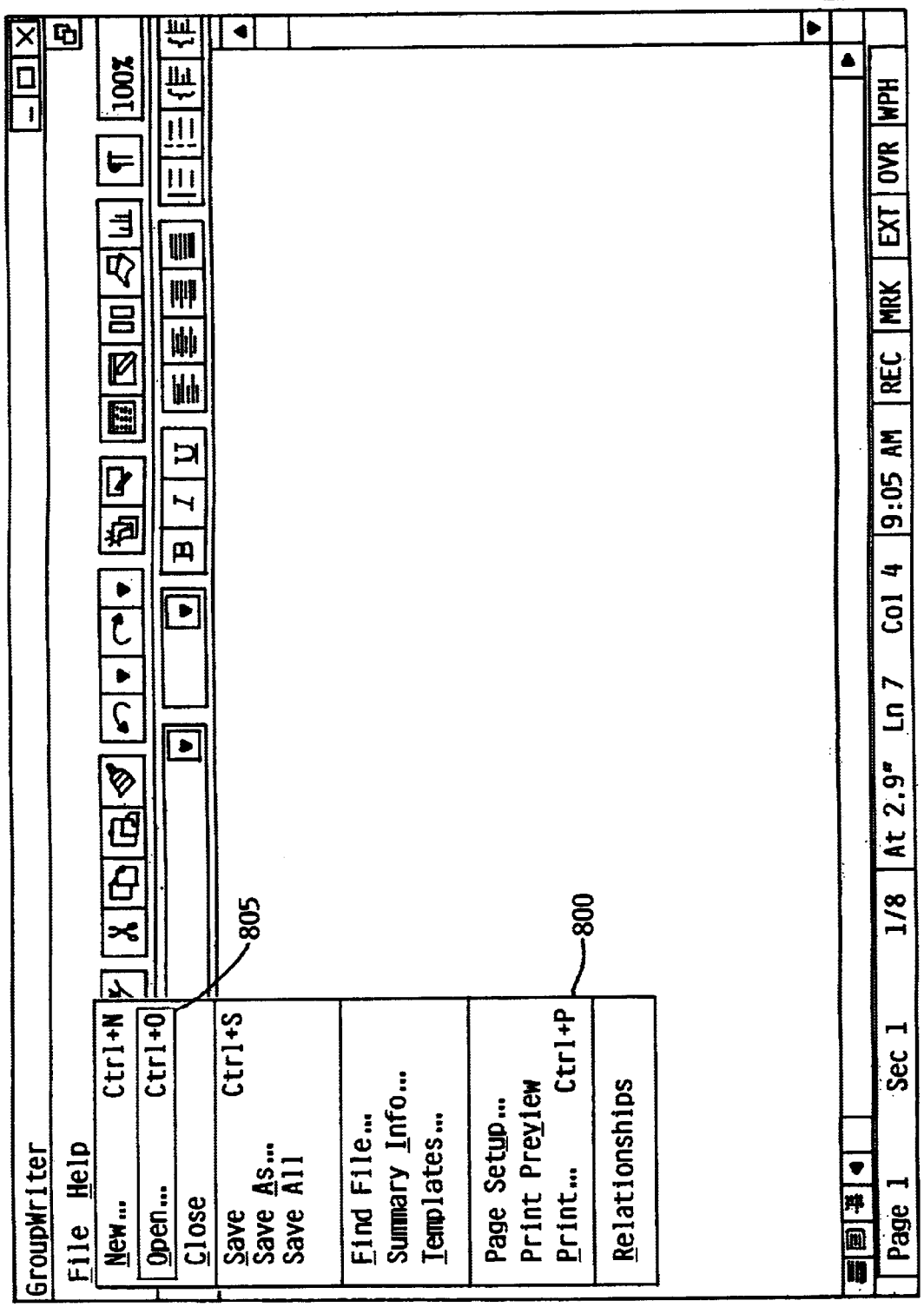
FIGS. 8 through 14B are diagrams that show the user interface used in the preferred embodiment of the present invention.
Figure 9:
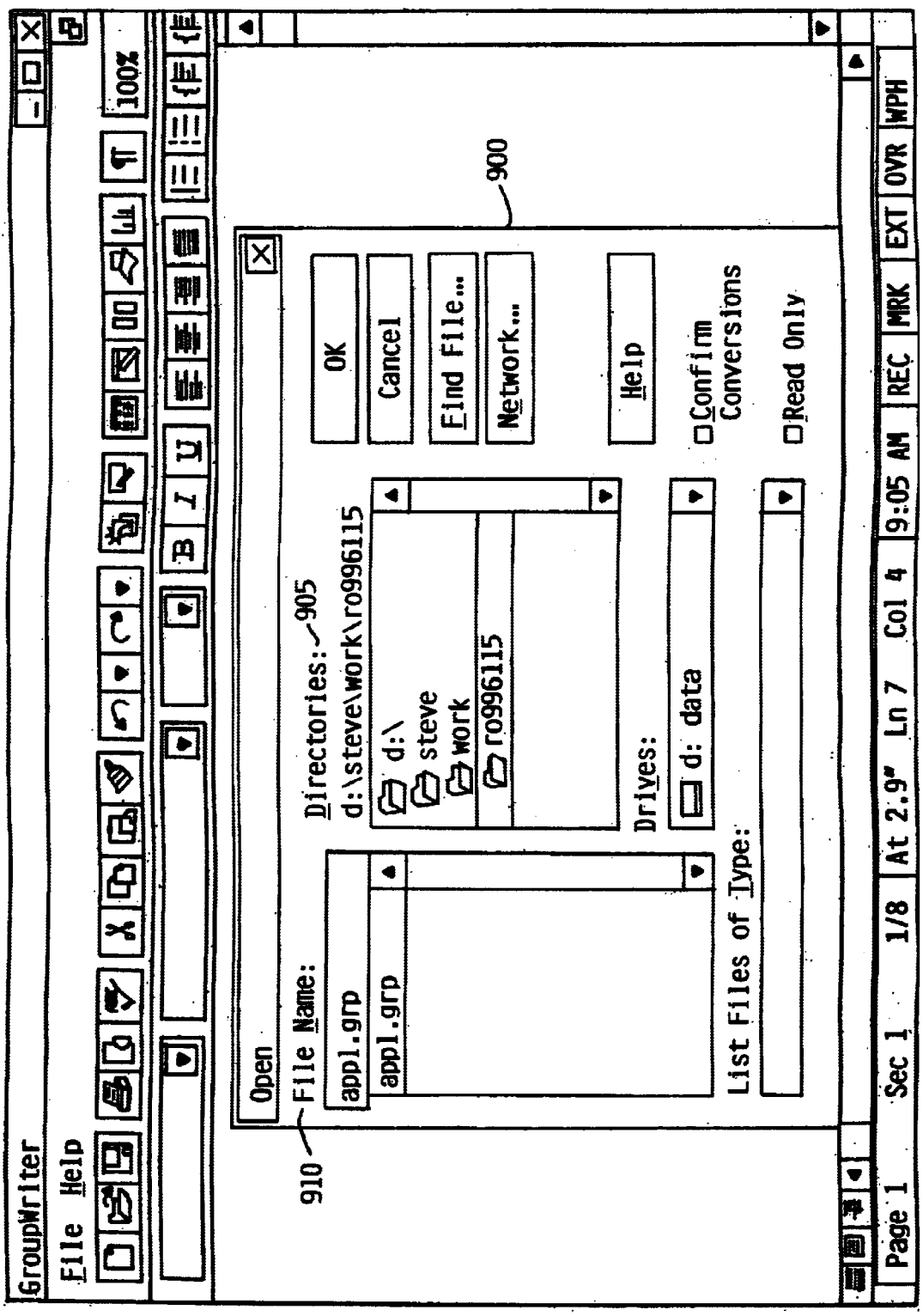
Figure 10:
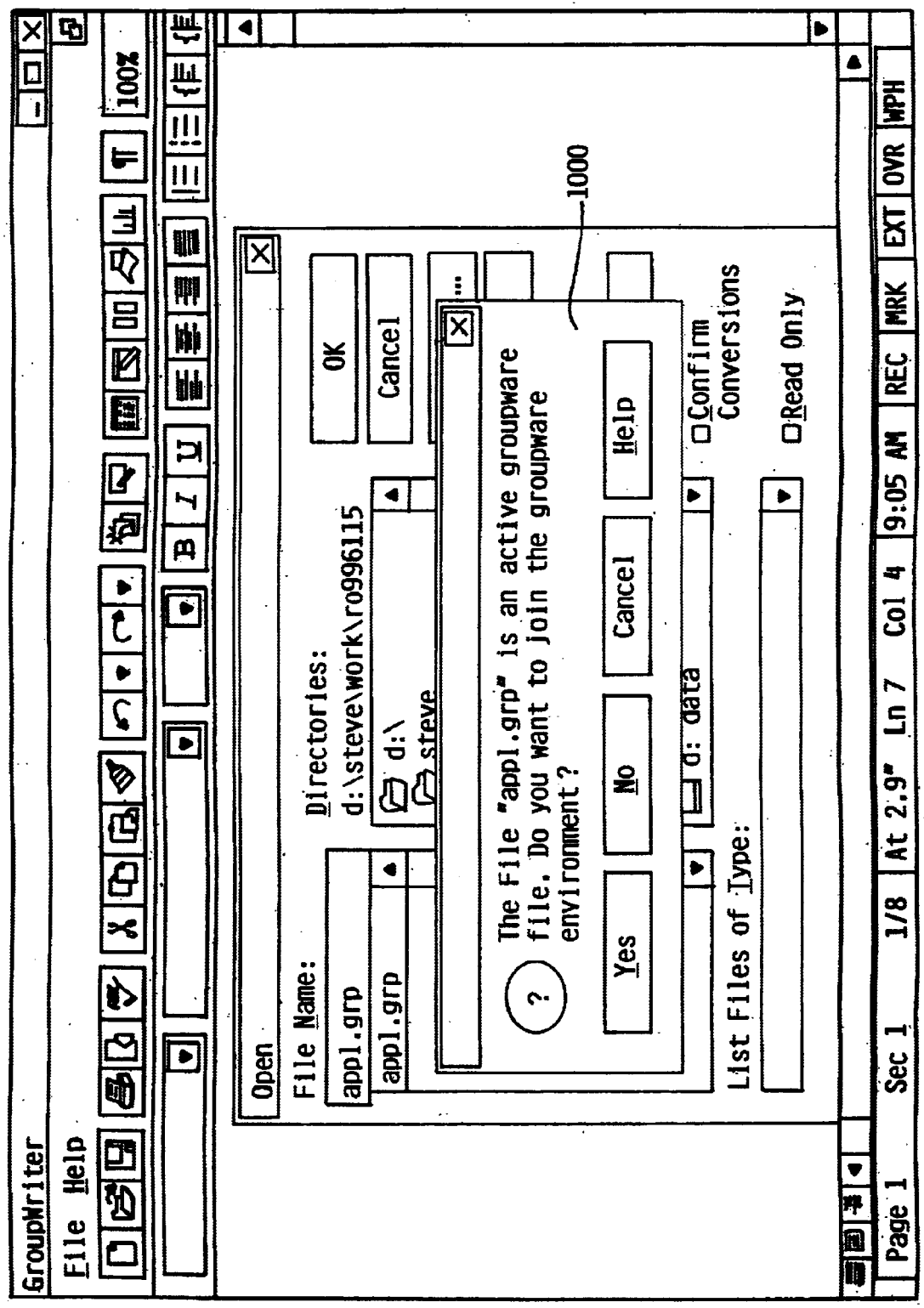

FIGS. 8 through 14B are diagrams that show the graphical user interface of groupwriter client processes 250. In FIG. 8, the user selects open command 805 from pull-down menu 800. This action causes presentation of open dialog box 900, which is shown on FIG. 9. Within dialog box 900 the user can specify and select a particular file through directories selection box 905 and file selection box 910. The suffix "grp" is used in the preferred embodiment to denote objects that are subject to groupware control; however, other conventions could be used. FIG. 9 further shows the user selecting a file called "appl.grp." This selection will cause the display of selection box 1000, which is shown on FIG. 10.

Selection box 1000 is used to ensure that the user is aware of the fact that they are about to open a groupware object. When the user selects the YES option of selection box 1000, an open command is generated. This open command is received and processed by user command processor 358, which is described in more detail in the text associated with FIG. 15. The successful outcome of this processing, though, is presentation of the selected groupware object to the requesting user.

Figure 11:
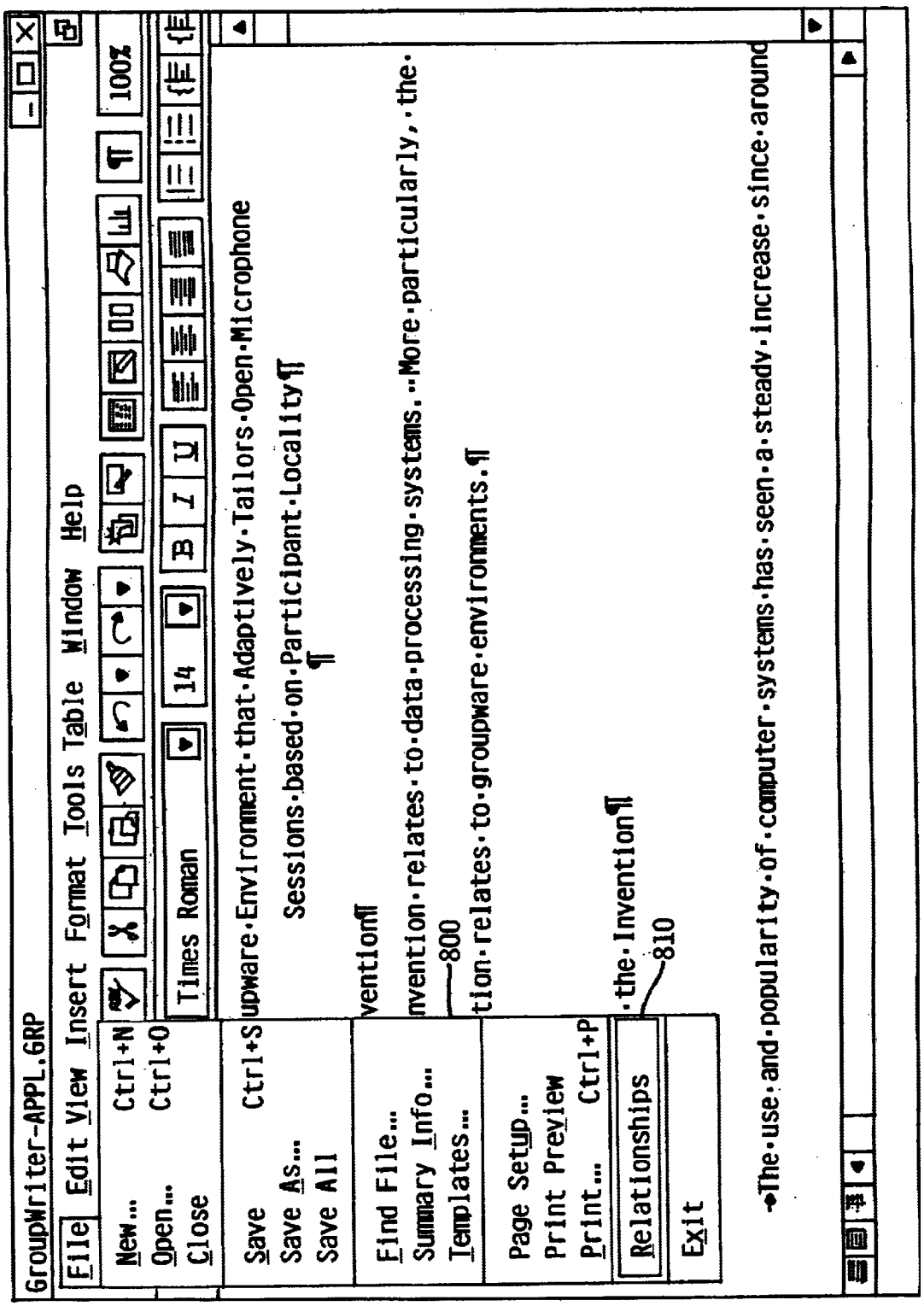
Figure 12:
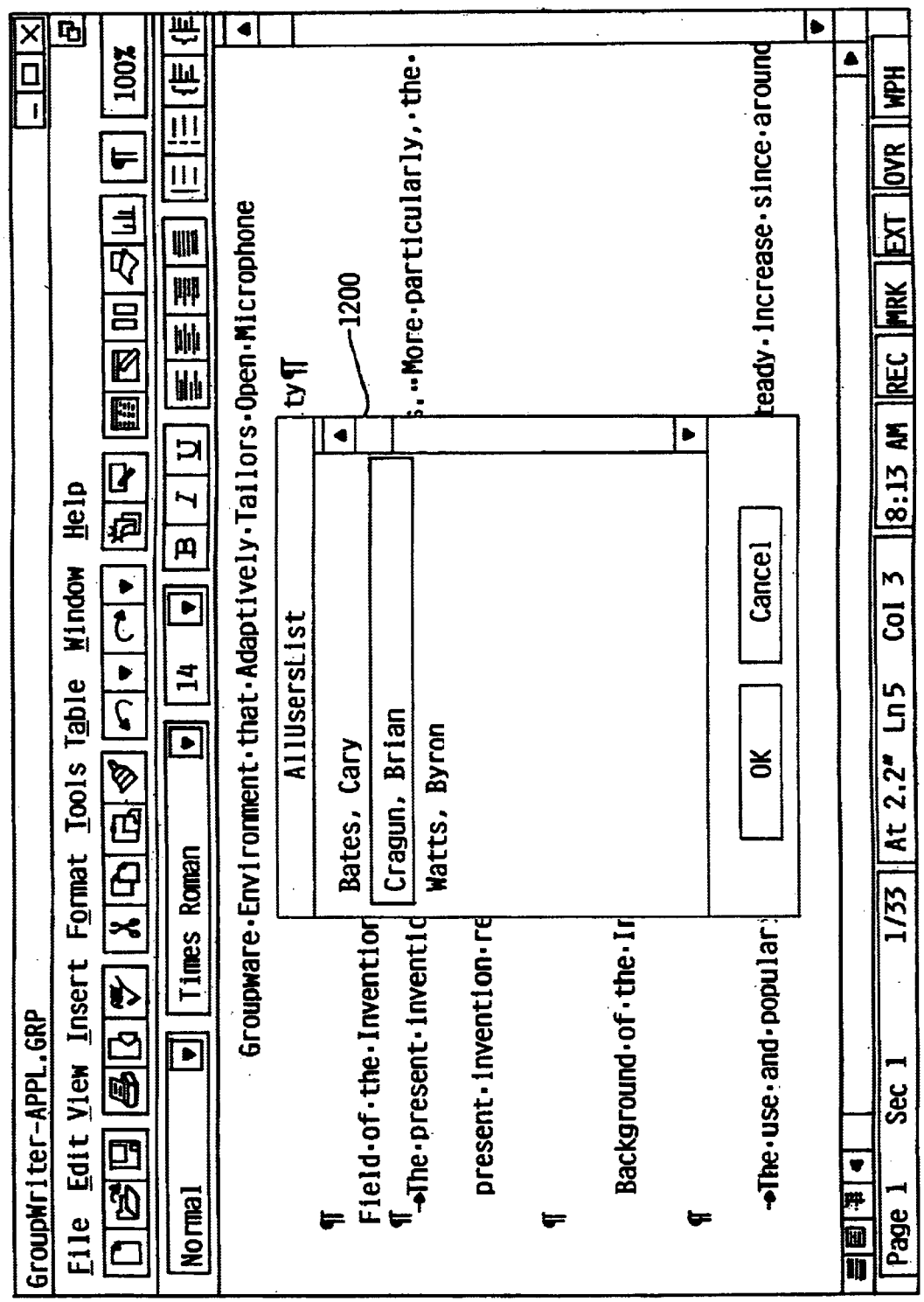
Figure 13:
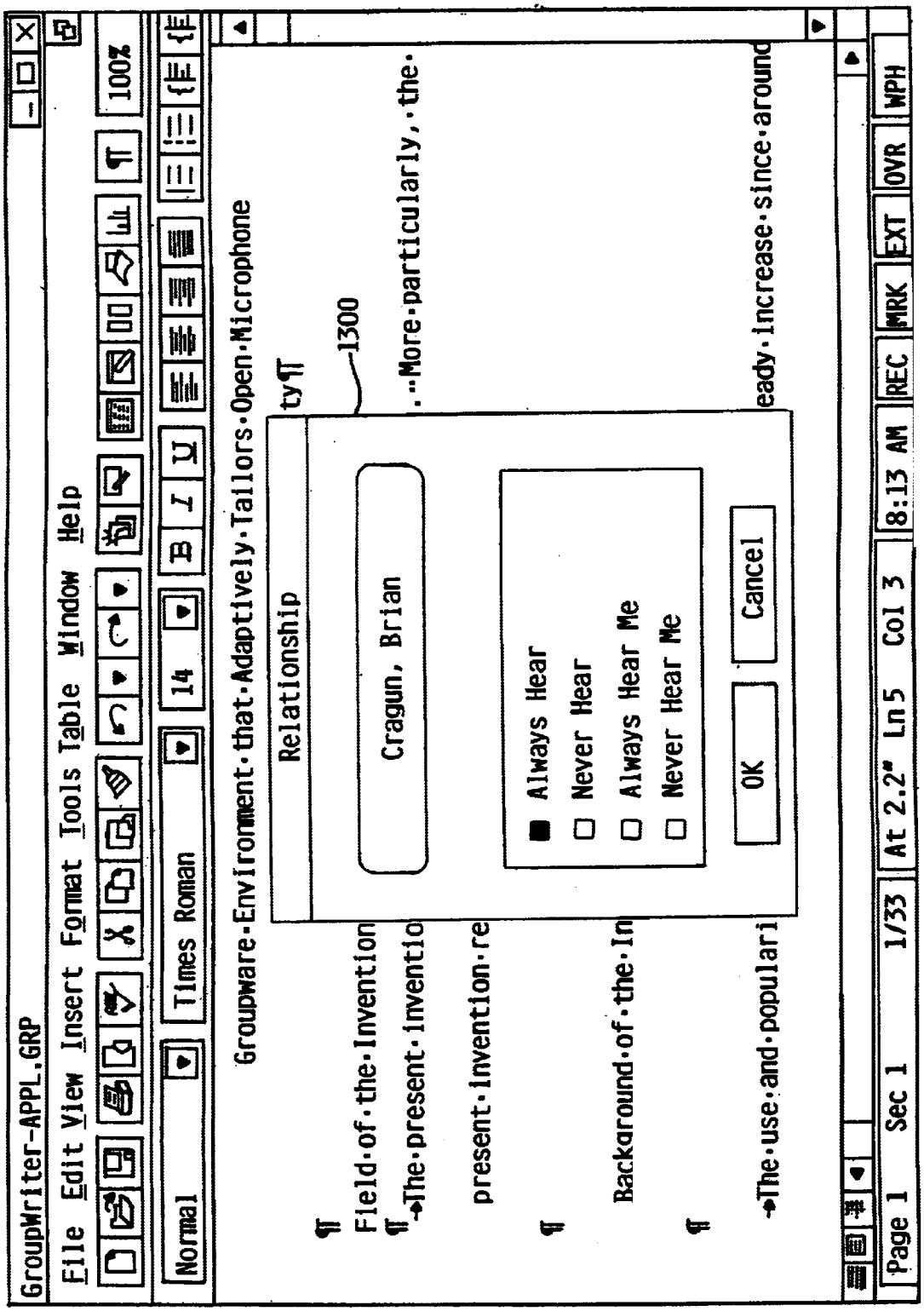
Figure 14A:
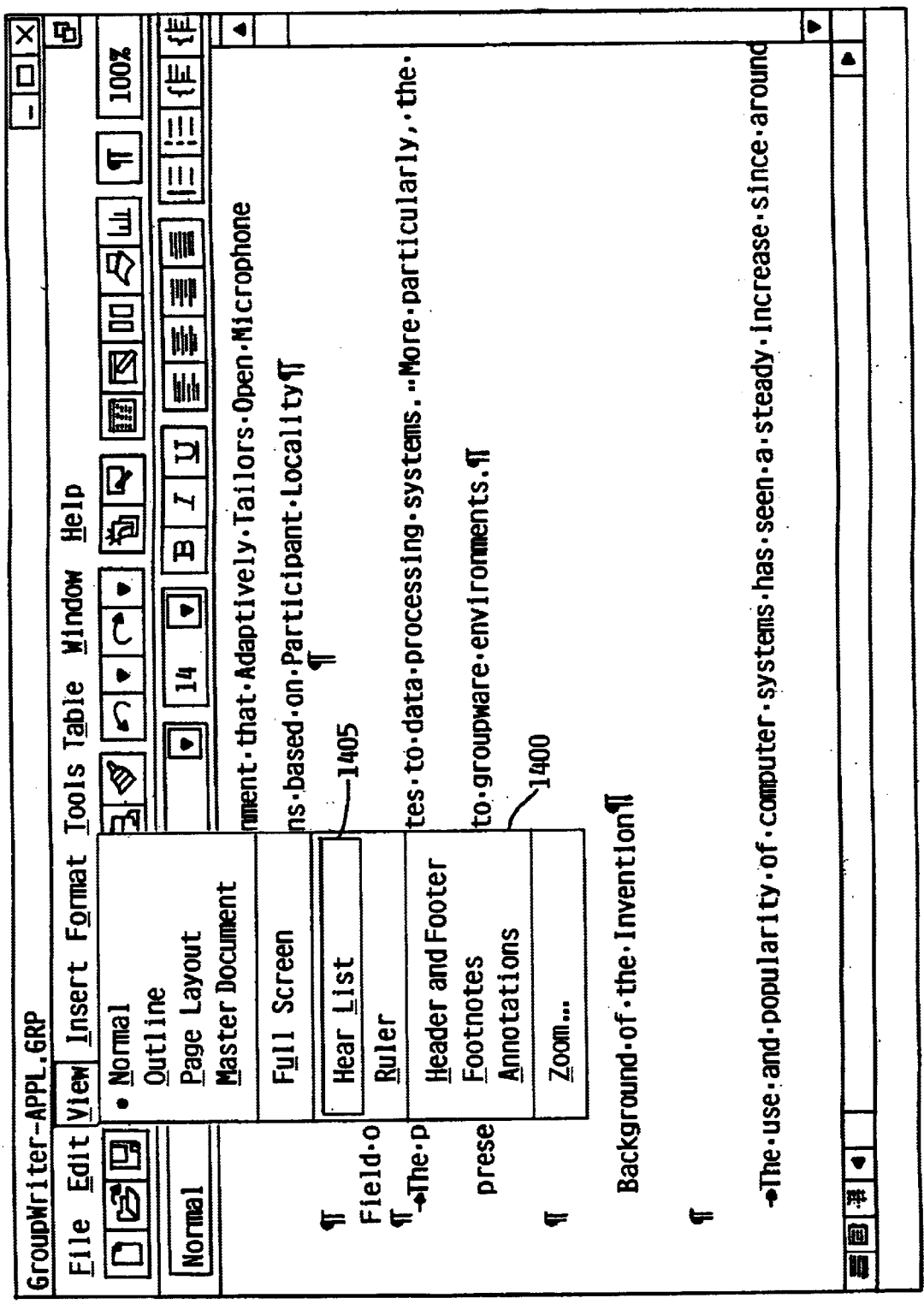
Figure 14B:
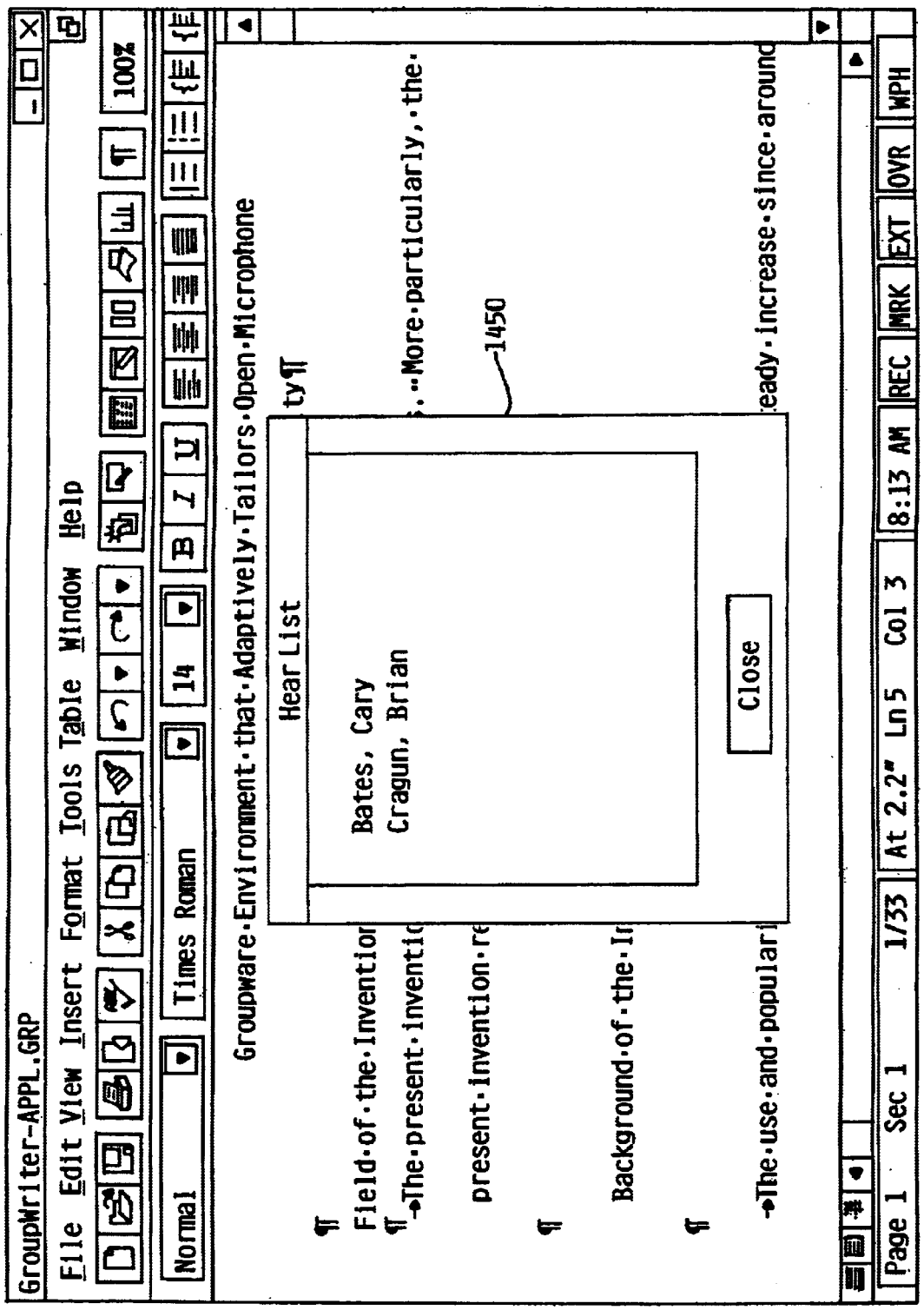

Once a groupware object has been retrieved and presented to the user, he or she may then control relationships with other users. By this we mean the extent to which the user can hear other users and the extent to which the other users can hear the subject user. FIG. 11 shows the first step of this process. As shown, the user will select relationships command 810 from pull-down menu 800, which causes presentation of All Users List 1200. All Users List 1200, which is shown on FIG. 12, is a selection box that contains the name of every user that is currently working on the subject groupware object. This selection box is used to select the user for which a change of relationships is desired. For example, our user may decide to change their relationship with user Cragun. To do so, the user will select Cragun's name, which will cause presentation of relationship selection box 1300. Relationship selection box 1300 is shown on FIG. 13. The user can then select the always hear, never hear, always hear me, or never hear me options. Selection of any of these options generates a command that is received and processed by user command processor 358. If the user wants to always hear user Cragun, the user will select the always hear option (e.g., as shown). If the user does not want to ever hear user Cragun, the user will select the never hear option. If the user wants user Cragun to always hear them, the user will select the always hear me option. Finally, if the user does not want user Cragun to hear what they say, the user will select the never hear me option. Note here that the always hear and never hear options and the always hear me and never hear me option cannot be turned on at the same time (i.e., because they represent mutually exclusive functions). However, other combinations of options are possible.

Another facility of the invention, the hear list, is initiated through hear list command 1405 of pull-down menu 1400. Pull-down menu 1400 is shown on FIG. 14A. As with the previously described commands, selection of this menu item causes the generation of a command that is received and processed by user command processor 358. The result of that processing is shown on FIG. 14B. Hear list 1450 shows the user all of the users that can currently hear what he or she says. Hear List 1450 is periodically refreshed such that it maintains an updated list of what users are able to hear the subject user.

Note that while user Watts' name was present in All Users List 1200, that his name does not appear in Hear List 1450. This is because user Watts cannot hear what the subject user is saying. User Watts may not be able to hear because he is too far away, because he has set up a never hear relationship with our user, because our user has set up a never hear me relationship with him, or for a variety of other reasons that pertain to the conversation separation and/or auto squelch facilities of the present invention. Note also that while Hear List 145 is shown as a pop-up box in the middle of our user's screen, that it can be moved and remain active in a way that does not block our user's view of the object. It should be further understood that Hear List 145 may also be presented as a status bar, checklist, or in some other form and yet still fall within the spirit and scope of the present invention.

Figure 15A:
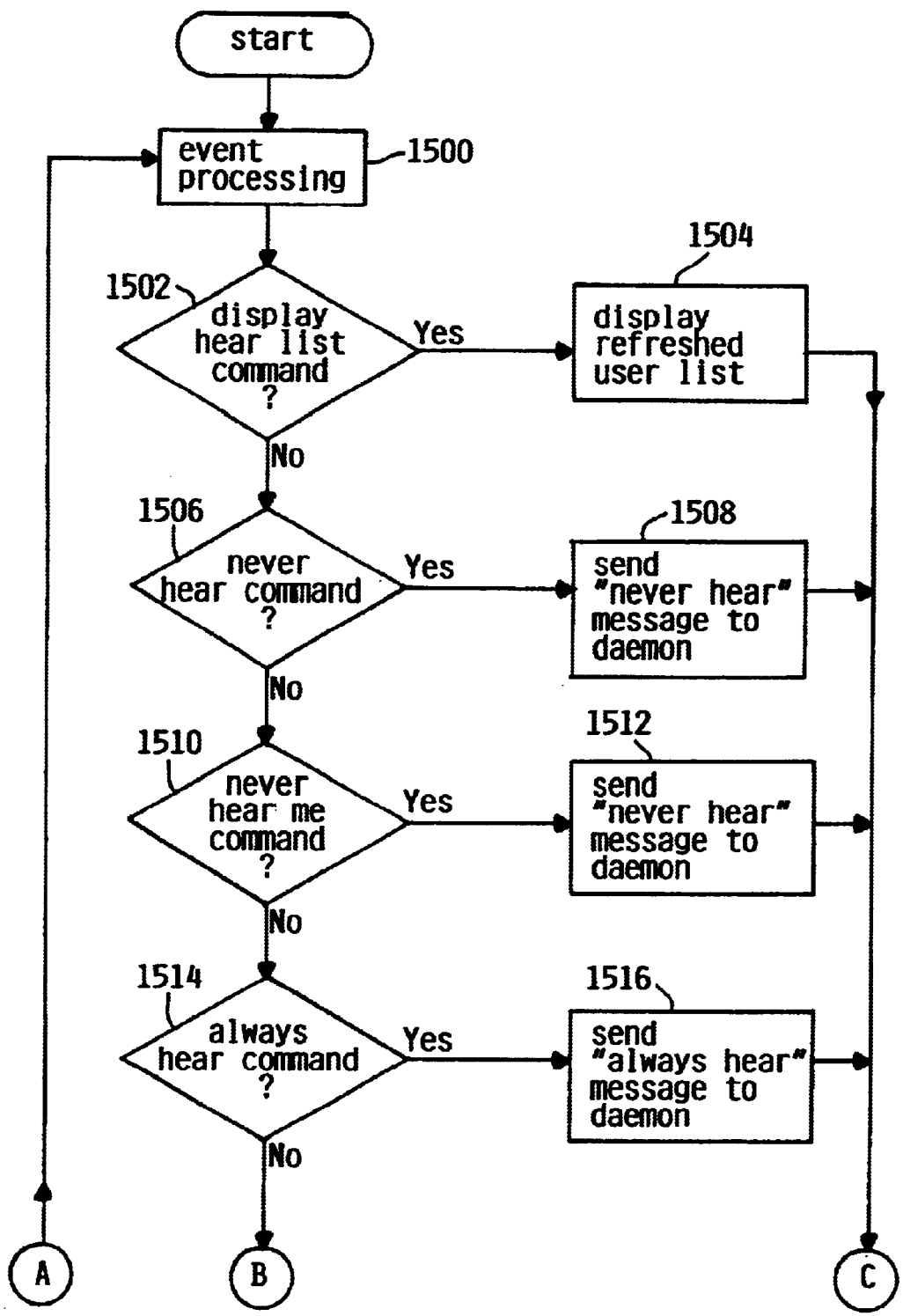
FIG. 15 is a diagram that shows the user command processor that is used in the preferred embodiment of the present invention.
Figure 15B:
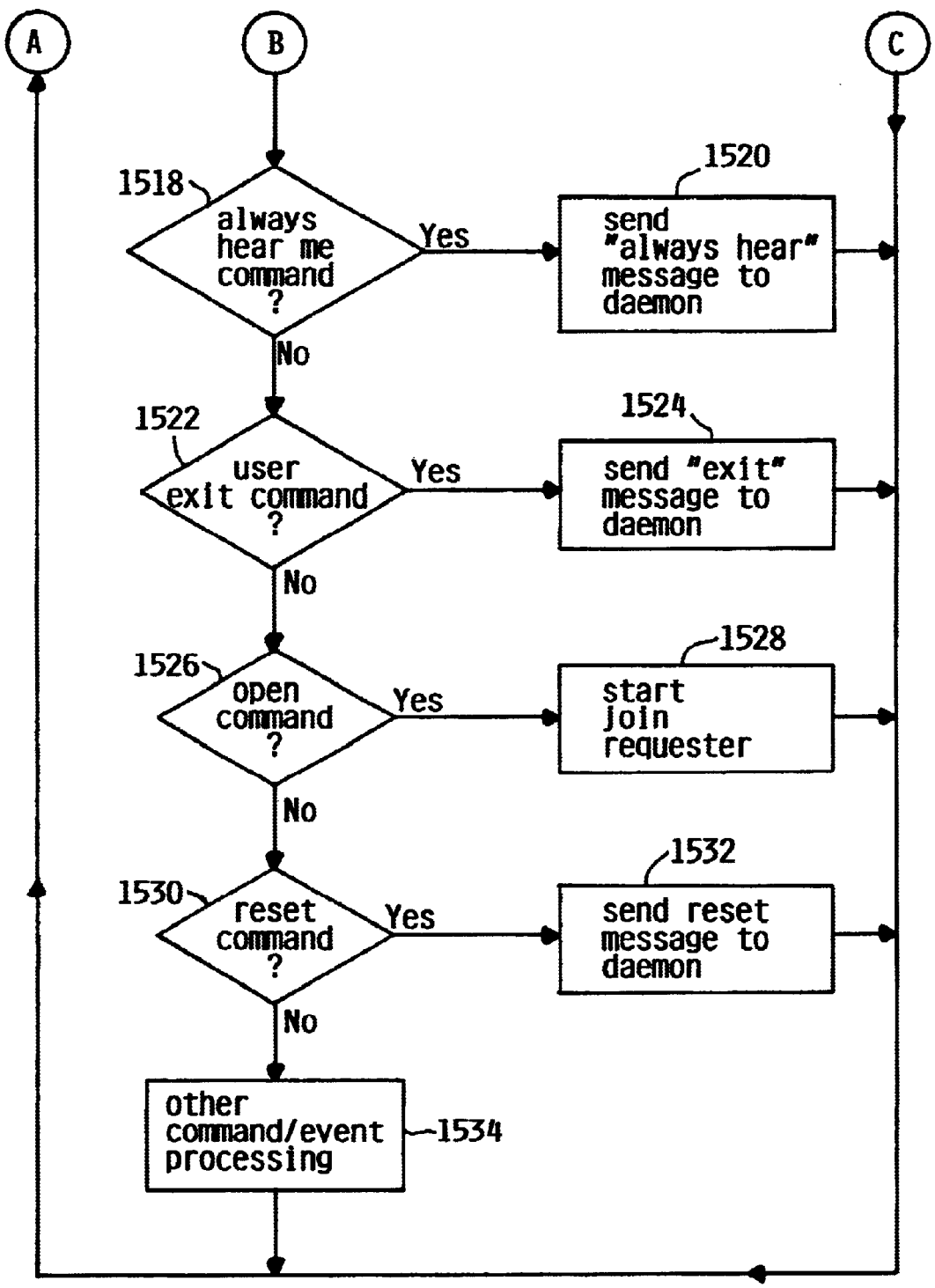

FIG. 15 shows the inner workings of user command processor 358. User command processor is continually executing after first being initiated by the user as part of the initial bring-up of groupware client process 342. In block 1500, user command processor 358 performs initial command/event processing. It is at this point that user command processor 358 receives inbound events and commands and determines the event/command type. If the command is a display hear list command [block 1502], user command processor 358 proceeds to display the refreshed hear list [block 1504]. As mentioned, the display hear list message is generated when the user requests its display via the menu shown on FIG. 14A and described in the associated text.

If the command is a never hear command [block 1506], a never hear message is sent to the object controller (i.e., one of object controllers 246) associated with the subject object [block 1508]. As mentioned, a never hear message is sent when the user informs groupwriter client process 342 that he or she does not want to hear a specified user. In this case, the "affected" and "subject of" process identifier fields of the never hear message respectively contain the process id. of the requesting groupwriter client process and that of the process whose user is not to be heard. If the command is a never hear me command [block 1510], a never hear message is sent to the object controller associated with the subject object [block 1512]. As mentioned, a never hear message of this type is sent when the user informs groupwriter client process 342 that he or she does not want a specified user to hear them. In this case, the "affected" and "subject of" process identifier fields of the never hear message respectively contain the process id. of the process of the user that is not to hear and that of the requesting groupwriter client process.

If the command is an always hear command [block 1514], an always hear message is sent to the object controller associated with the subject object [block 1516]. As mentioned, an always hear message is sent when the user informs groupwriter client process 342 that he or she want to always hear a specified user. In this case, the "affected" and "subject of" process identifier fields of the always hear message respectively contain the process id. of the requesting groupwriter client process and that of the process whose user is always to be heard. If the command is an always hear me command [block 1518], an always hear message is sent to the object controller associated with the subject object [block 1520]. As mentioned, an always hear message of this type is sent when the user informs groupwriter client process 342 that he or she always wants a specified user to hear them. In this case, the "affected" and "subject of" process identifier fields of the always hear message respectively contain the process id. of the process of the user that is always to hear and that of the requesting groupwriter client process.

If the command is a user exit command [block 1522], an exit message is sent to the object controller associated with the subject object [block 1524]. An exit message is sent when the user informs groupwriter client process 342 that he or she wants to stop working with the subject object. Note here that each of these last five commands is routed directly from daemon 242 to the receiving groupwriter client process (i.e., the "affected" process in this case), where they are processed by control block manager 355. Control block manager 355 is discussed in the text associated with FIGS. 19A and 19B.

If the command is an open command [block 1526], join requester 344 is initiated in block 1528. As mentioned, open commands are initiated by the user through pull-down menu 800 (as shown on FIG. 8). If the command is a reset command [block 1530], a reset message is sent to the daemon [block 1532]. Reset commands are initiated by the user when he or she deselects a relationship in dialog box 1300 of FIG. 13.

All other command/event processing is handled in block 1534. Examples of commands and events that fall into this processing include: cursor events, edit events, and other menu commands.

Figure 16:
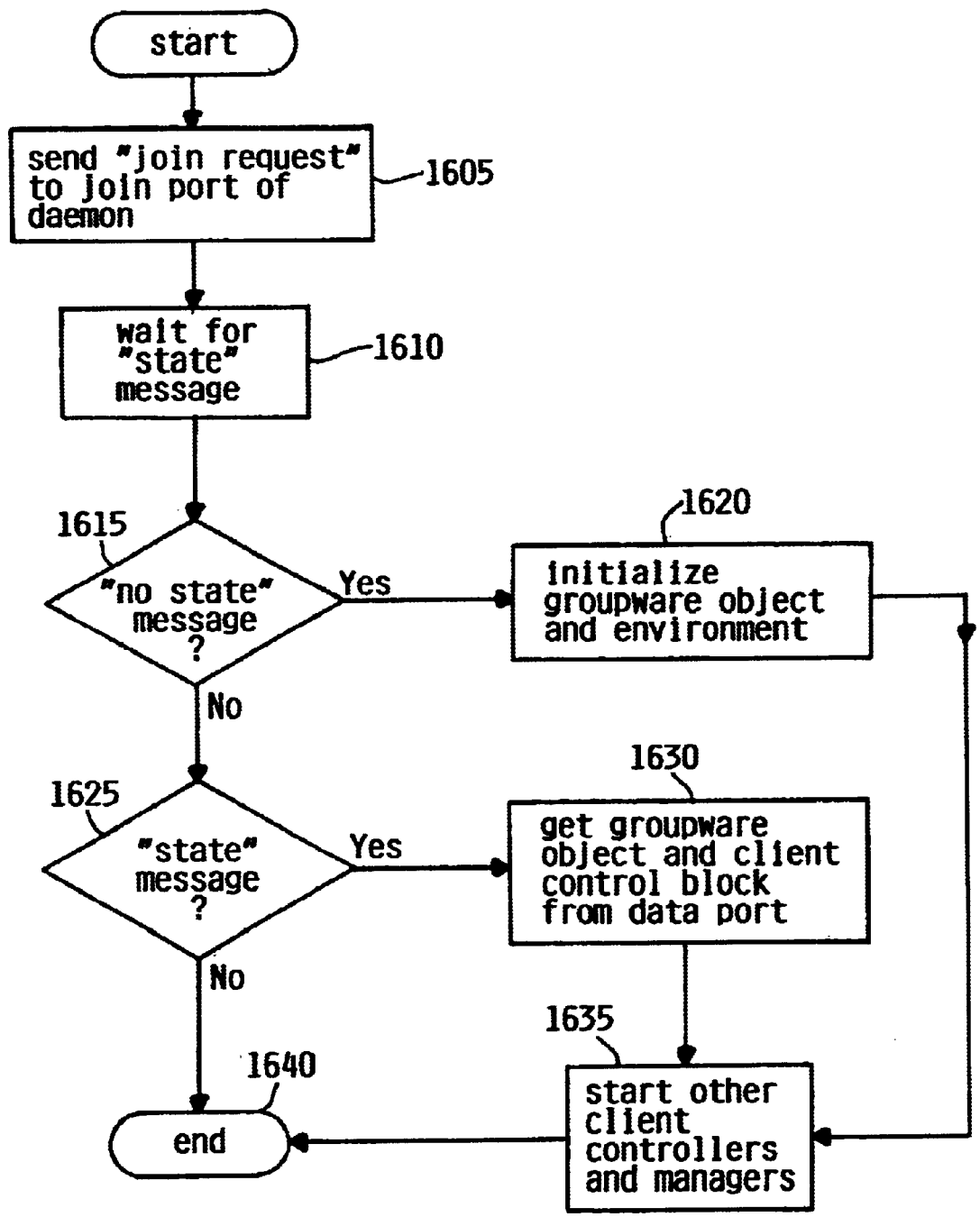
FIG. 16 is a diagram that shows the join requester that is used in the preferred embodiment of the present invention.
Figure 17:
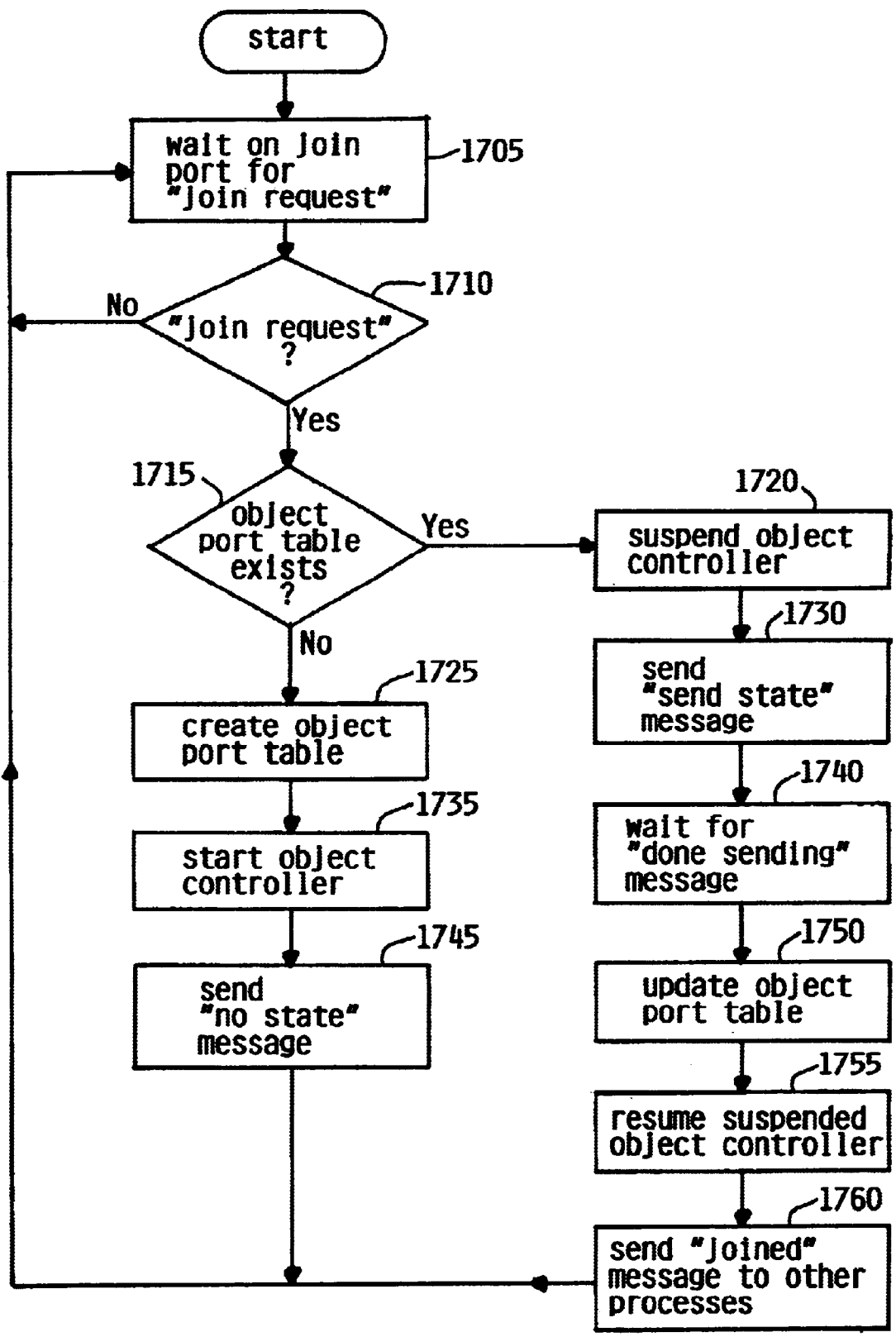
FIG. 17 is a diagram that shows the join request processor that is used in the preferred embodiment of the present invention.

FIG. 16 is a diagram showing steps used in the preferred embodiment to carry out the processing of join requester 344 and FIG. 17 is a diagram showing the steps used to carry out the processing of join request processor 247. These two diagrams will be described together to best explain how join requests are handled within the preferred embodiment of the present invention. As mentioned, an open command by a user ultimately causes the initiation of join requester 344 [see block 1526 of FIG. 15]. Join requester 344 begins processing in block 1605 of FIG. 16 by sending a join request to the join port of daemon 247. A join request message, which is shown on FIG. 7B, contains the process identifier for the requesting groupwriter client process, the name of the object that the user wants to work with, and the voice and data ports of the requesting groupwriter client process. After dispatching the join request, the join requester 344 waits for a state message in block 1610.

The join request is received by join request processor 247 in block 1705 of FIG. 17. After affirming that the subject message is indeed a join request [block 1710], join request processor 247 determines whether an object port table exists for the object that is the subject of the join request [block 1715]. If an object port table does not exist, join request processor 247 creates an object port table for the subject object [block 1725], initiates an object controller [1735], sends a "no state" message to the requesting groupwriter client process [block 1745], and returns to block 1705, where it resumes its wait on the join port.

Returning to block 1715, join request processor 247 may determine that an object port table does exist. When this is the case, join request processor 247 suspends the associated object controller [block 1720] and sends a "send state" message [block 1730]. The send state message, which is shown on FIG. 7A, includes the data port of the requesting groupwriter client process (i.e., the process that issued the join request). The message is sent to any of the other groupwriter client processes that are currently associated with the subject object (i.e., one of the groupwriter client processes that have entries in the object port table for the subject object). The exact means used to make this selection is not important to the present invention, and accordingly, details are not included here. Once the send state message is sent, join request processor 247 waits for an indication of completion in the form of a "done sending" message [block 1740].

The done sending message, which is shown on FIG. 7B, signals the end of the transmission of the "state" message from the selected groupwriter client process to the requesting groupwriter client process. The state message, which appears on FIG. 7B, includes the current state of the object and the client control block (with default values). Once the done sending message is received, join request processor 247 updates the object port table to include an entry for the request groupwriter client process [block 1750], resumes the suspended object controller [block 1755], and sends a "joined" message to all of the groupwriter client processes associated with the subject object (i.e., all of the groupwriter client processes that have entries in the object port table) [block 1760]. The joined message, which is shown on FIG. 7B, includes a client control block entry for the requesting groupwriter client process. Having completed its processing join request processor 247 returns to block 1705 where it resumes its wait on the join port.

While waiting in block 1610 of FIG. 16, join requester 344 will receive either a state message from another groupwriter client processor a no state message from join request processor 247. If the message received is a no state message [block 1615], join requester 244 proceeds to initialize the groupware object and the groupware environment [block 1620]. For example, if the object is a document, initialization may simply mean creating an empty document having the name of the object for which the request was made. Other types of groupware objects may require more involved initialization; however, details of what such initialization might entail are not provided here since they are not important to the present invention. Initialization of the groupware environment involves creation of client control block 600 for the subject object/groupwriter client process. In the preferred embodiment, this initialization involves use of a default control block that is stored on the client computer's HDD or that is somehow otherwise available to the requesting groupwriter client process. Those skilled in the art will appreciate that other initialization options would also work within the context of the present invention.

If the received message is a state message [block 1625], join requester 244 retrieves the groupware object and client control block from its data port [1630].

Regardless of whether a state or no state message is received in block 1610, join requester 344 will eventually start the other client controllers and managers (e.g., voice input controller 346 and voice output controller 348) [block 1635], and ends its processing in block 1640.

Figure 18:
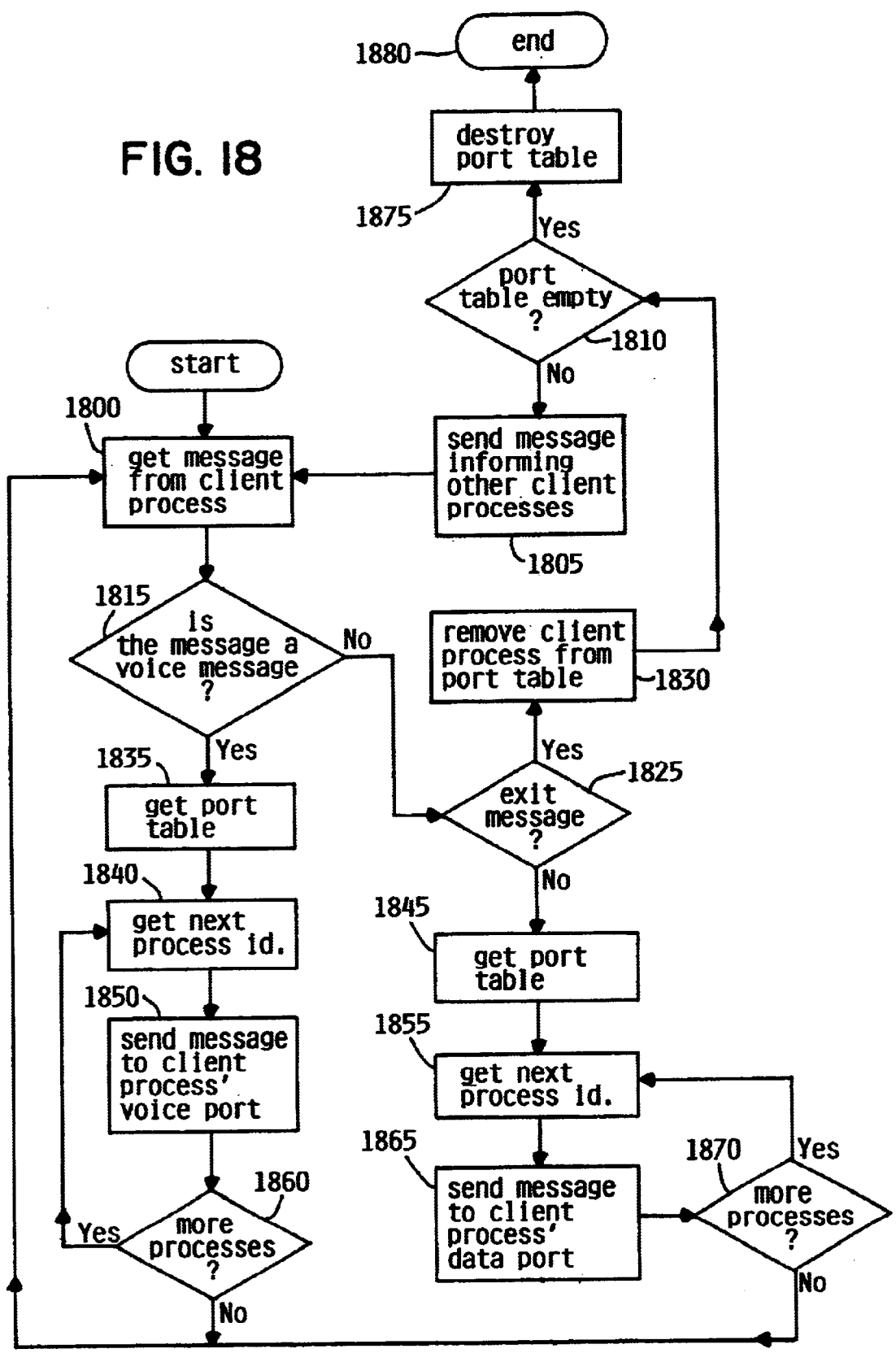
FIG. 18 is a diagram that shows the object controller that is used in the preferred embodiment of the present invention.

FIG. 18 is a diagram showing steps used in the preferred embodiment to carry out the processing of the object controllers of the preferred embodiment (i.e., one of object controllers 246). As explained earlier, object controllers are initiated in block 1735 of FIG. 17. Once initiated, the object controller receives and routes messages from/to groupwriter client processes. For the most part, every voice and/or data message that is generated by a groupwriter client process is sent to the object controller for the subject object. It is then up to the object controller to route the message to the appropriate port of the other groupwriter client processes. The object controller will first determine whether the received message is a voice or data message [block 1815]. (Please refer to FIGS. 7A through 7C: voice messages have message identifiers of 12, 13, or 14—all other messages are data messages.)

If the received message is a voice message, the object controller retrieves its port table [block 1835] and proceeds to route the message to the voice port of each of the groupwriter client processes that have entries in the table [blocks 1840, 1850, and 1860]. After the voice message has been routed to each groupwriter client process, the object controller returns to block 1800, where it begins processing of the next message or waits for a message to arrive.

If the received message is a data message, but not an exit message [block 1825], the object controller retrieves its port table [block 1845] and proceeds to route the message to the data port of each of the groupwriter client processes that have entries in the table [blocks 1855, 1865, and 1870]. After the voice message has been routed to each groupwriter client process, the object controller returns to block 1800, where it begins processing of the next message or waits for a message to arrive.

If the received message is an exit message [block 1825], the object controller removes the issuing groupwriter client process from its port table [block 1830] and determines whether its port table is empty (i.e., whether the issuing groupwriter client was the only (last) process that was working on the subject object) [block 1810]. If yes, the object controller destroys the object port table [block 1875] and ends its processing in block 1880. If the port table is not empty, the object controller routes the exit message to the other groupwriter client processes [block 1805] and returns to block 1800, where it begins processing of the next message or waits for a message to arrive.

Figures 1, 19A:
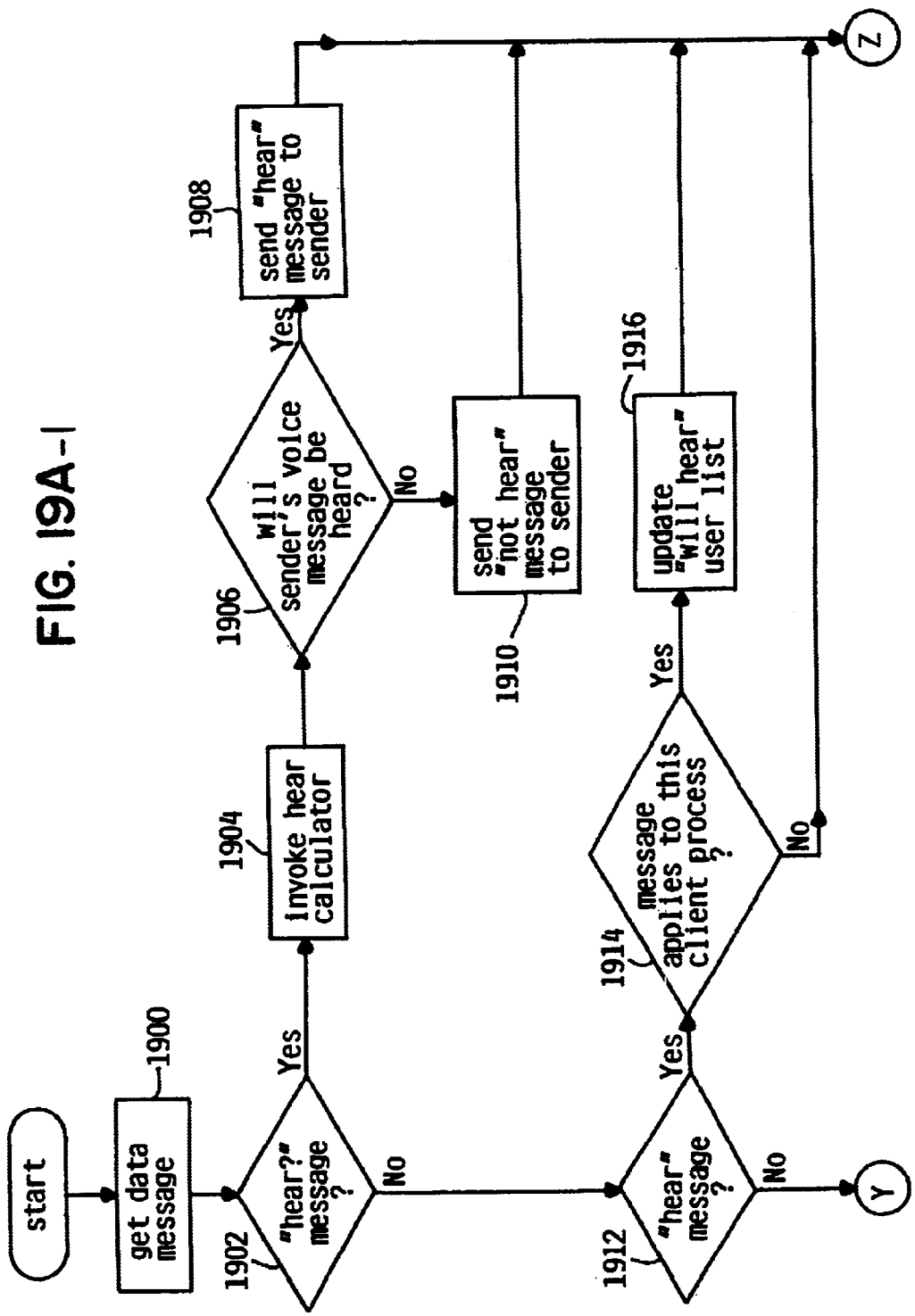
FIGS. 19A and 19B are diagrams that show the control block manager that is used in the preferred embodiment of the present invention.
Figures 2, 19A:
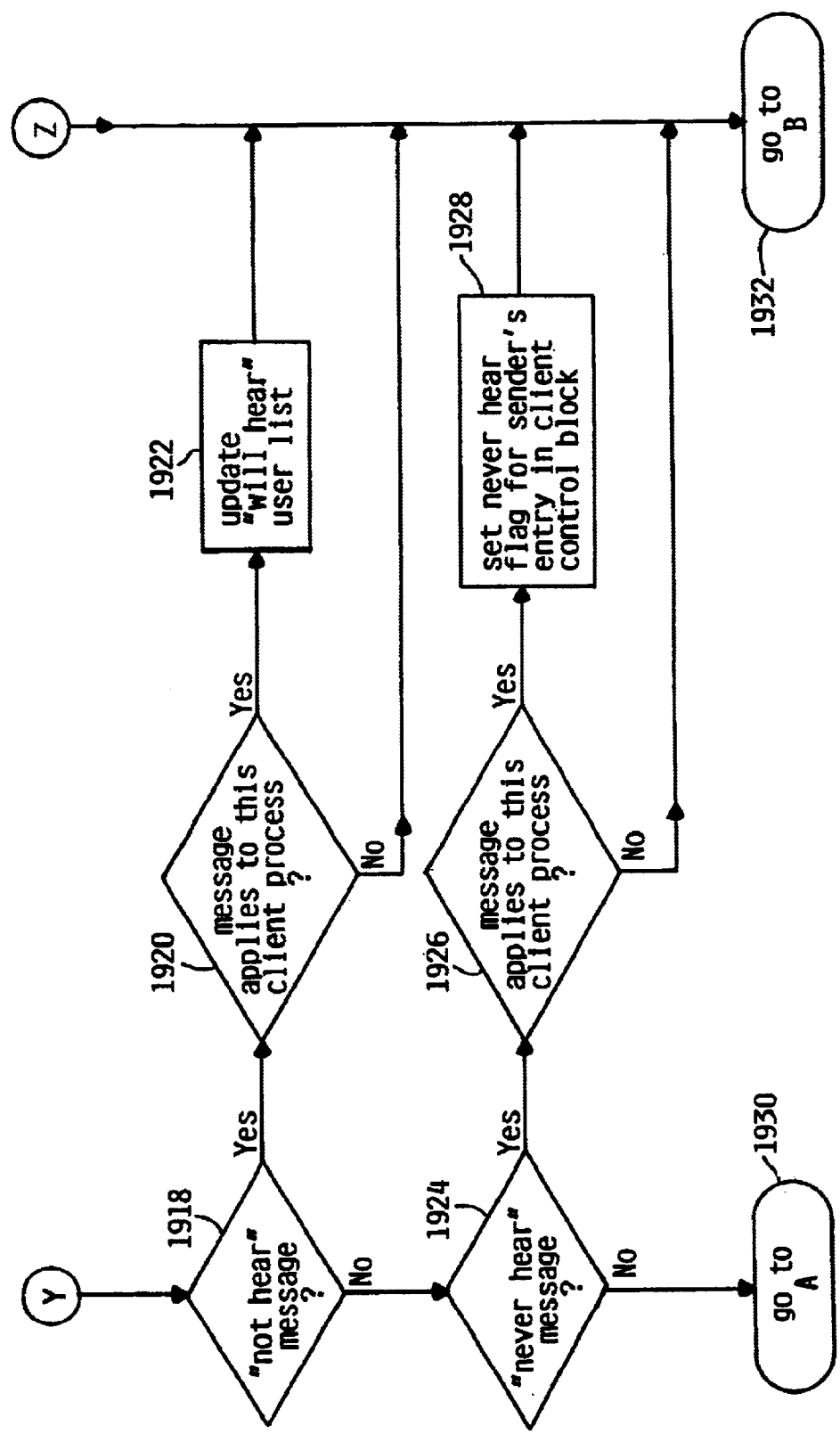
Figures 1, 19B:
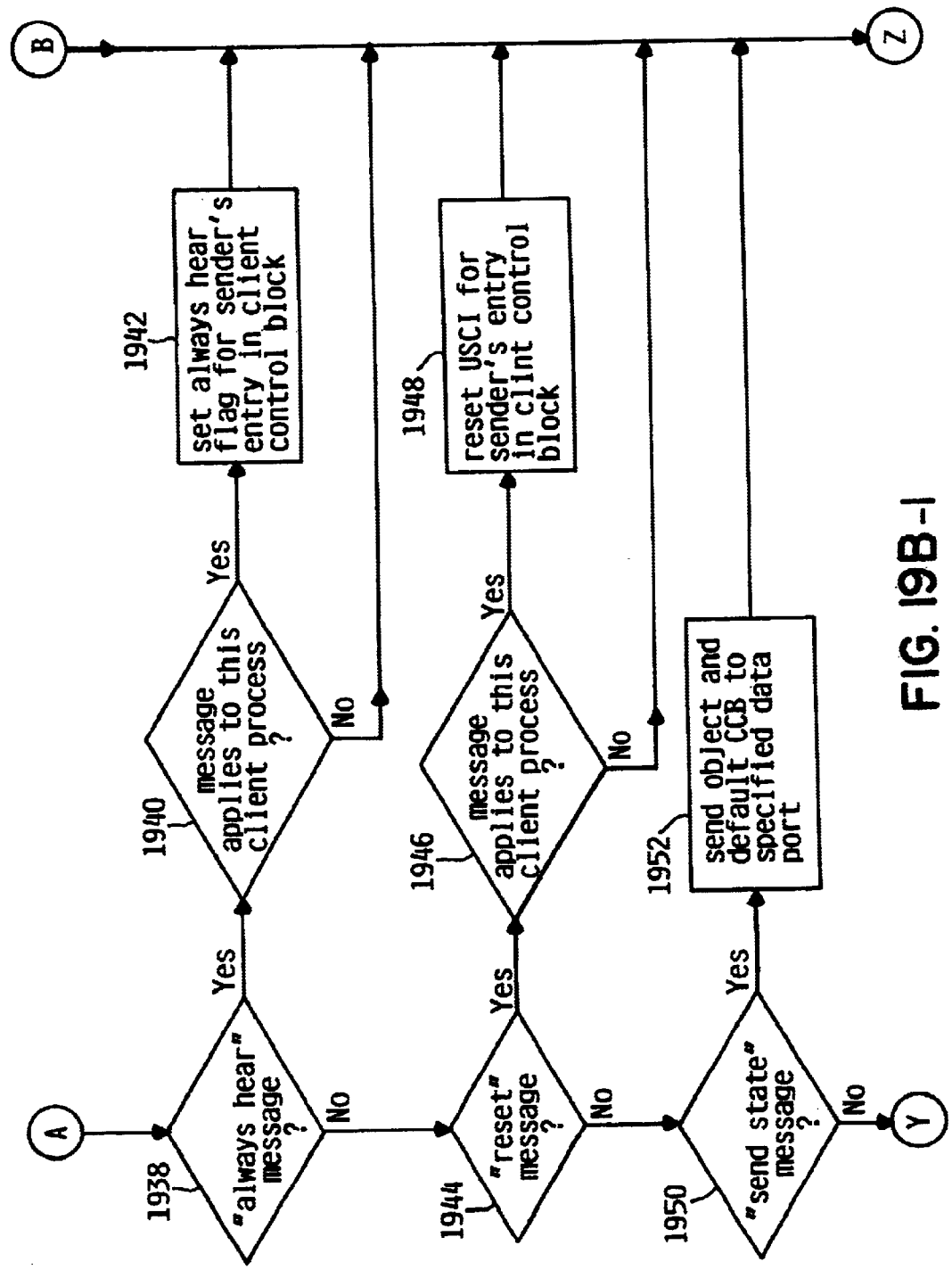
Figures 2, 19B:
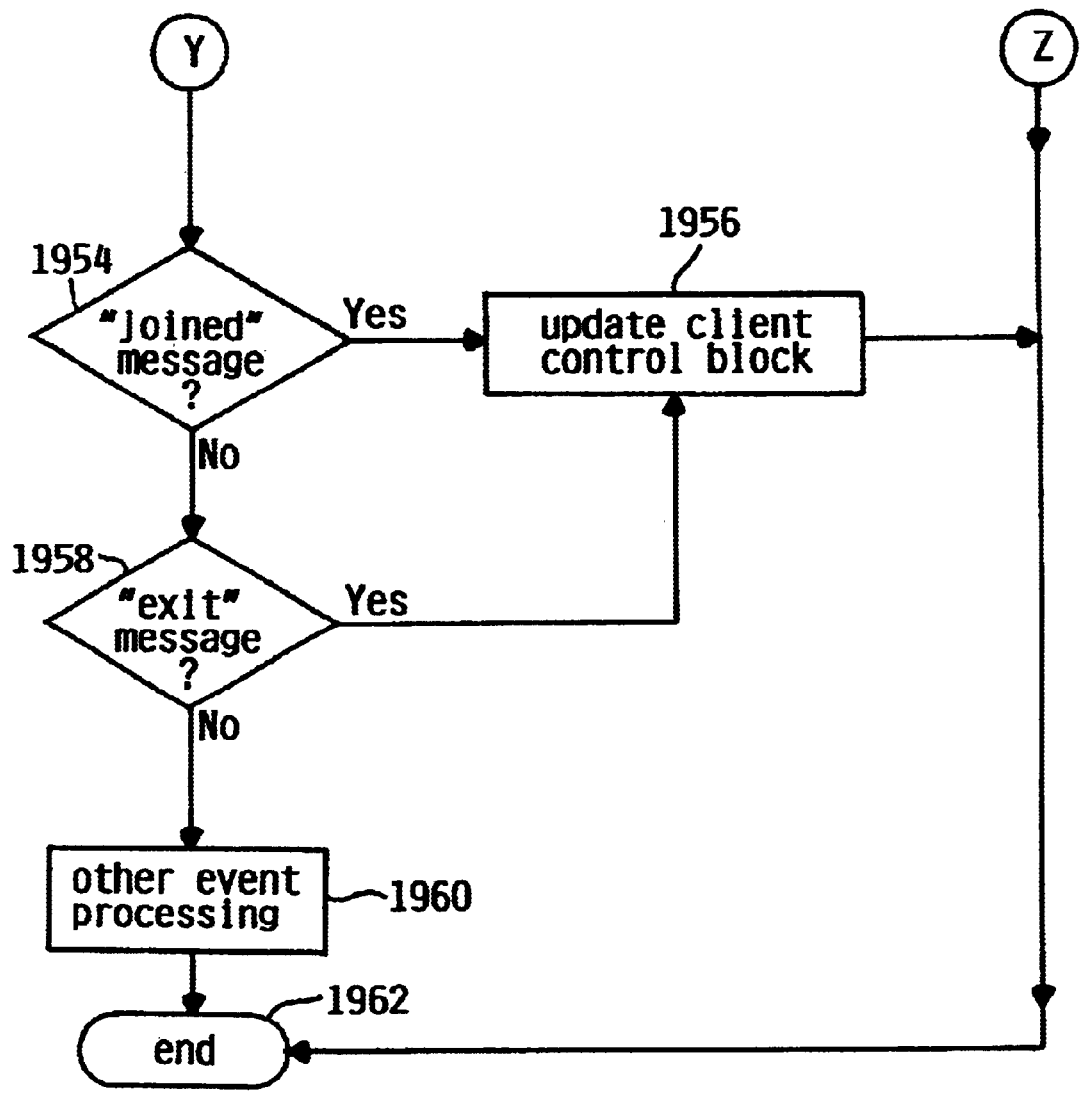

When data messages are sent by the object controller, they are received off of the data port of each groupwriter client process by groupwriter client process' control block manager. FIGS. 19A and 19B are diagrams that show the steps taken to carry out the processing of control block manager 355 of the preferred embodiment.

Data messages are received in block 1900 after which a series of tests are used to determine what type of data message is involved. The first test [block 1902] is used to determine whether the subject message is a "hear?" message. If so, the command block manager invokes hear calculator 361 [block 1904]. Hear calculator 361 pertains to concepts that are first introduced in the discussion of voice input controller 346. Accordingly, the description of hear calculator 361 (FIG. 26) is delayed until after the description of FIG. 23. It is important to note, though, that the output of hear calculator 361 is an indication of whether voice messages from the issuing groupwriter client process will be played for the user of the groupwriter client process that is receiving the hear? message (i.e., the groupwriter client process for which the message is currently being processed by its control block manager). If the message will be played [block 1906], a "hear" message is sent to the requesting groupwriter client process (i.e., through the object controller for the subject object) [block 1908]. If the message will not be played, a "not hear" message is sent to the requesting groupwriter client process [block 1910]. Please consult FIGS. 7A and 7C for the contents of the hear?, hear, and not hear messages.

If the message is not a hear? message, the next test is used to determine whether the received data message is a hear message [block 1912]. If so, the control block manager next determines whether the hear message applies to its groupwriter client process [block 1914]. Note here that, as mentioned, the vast majority of messages received by the object controller are routed to each groupwriter client process irrespective of whether the message was actually intended for the receiving groupware client process. This step, then, acts as a filter to prevent processing of messages that are not intended to be processed by the subject groupwriter client process. If the message does not apply to this client, the control block manager ends its processing in block 1962 of FIG. 19B. If the message does apply to this groupwriter client process, the "will hear" user list is refreshed to ensure that the user of the subject groupwriter client process is notified of the fact that the user of the groupwriter process that sent the hear message (i.e., the one that responded to a previously sent hear? message) can hear them [block 1916].

The next test is used to determine whether the received data message is a not hear message [block 1918]. If so, the control block manager next determines whether the message applies to its groupwriter client process [block 1920]. If the message does not apply to this client, the control block manager ends its processing in block 1962 of FIG. 19B. If the message does apply to this groupwriter client process, the "will hear" user list is refreshed to ensure that the user of the subject groupwriter client process is notified of the fact that the user of the groupwriter process that sent the hear message (i.e., the one that responded to a previously sent hear? message) does not appear as a user that can hear them [block 1922].

The next test is used to determine whether the received data message is a never hear message [block 1924]. If so, the control block manager next determines whether the message applies to its groupwriter client process [block 1926]. If the message does not apply to this client, the control block manager ends its processing in block 1962 of FIG. 19B. If the message does apply to this groupwriter client process, the never hear flag for the sending groupwriter client process entry (i.e., within the client control block) is set (see never hear flag 602 on FIG. 6) [block 1928]. The setting of this flag has the affect of not allowing the user of the receiving groupwriter client process to hear voice messages from the user that is the "subject of" the never hear message. This aspect of the present invention is explained in further detail in the text associated with FIG. 23.

Turning now to FIG. 19B, the next test is used to determine whether the received data message is an always hear message [block 1938]. If so, the control block manager next determines whether the message applies to its groupwriter client process [block 1940]. If the message does not apply to this client, the control block manager ends its processing in block 1962 of FIG. 19B. If the message does apply to this groupwriter client process, the always hear flag for the sending groupwriter client process entry (i.e., within the client control block) is set (see always hear flag 604 on FIG. 6) [block 1942]. The setting of this flag has the affect of ensuring that the user of the receiving groupwriter client process hears voice messages from the user that is the "subject of" the always hear message. This aspect of the present invention is explained in further detail in the text associated with FIG. 23.

The next test is used to determine whether the received data message is a reset message [block 1944]. A reset message is sent when a user deselects a relationship in dialog box 1300 of FIG. 13. If so, the control block manager next determines whether the message applies to its groupwriter client process [block 1946]. If the message does not apply to this client, the control block manager ends its processing in block 1962 of FIG. 19B. If the message does apply to this groupwriter client process, the USCI field specified in the reset message within the client control block entry for the sending groupwriter client process entry [block 1948].

The next test is used to determine whether the received data message is a send state message [block 1950]. If so, the control block manager sends the groupware object (in its current state) and a copy of its client control block (with default values for header 605 and for USCI fields 658) [block 1952].

The next test is used to determine whether the received data message is a joined message [block 1954]. If so, the control block manager updates its client control block [block 1956] by creating an entry for the joining groupwriter client process (i.e., via information contained in the join message).

The next test is used to determine whether the received data message is an exit message [block 1958]. If so, the control block manager updates its client control block [block 1956] by deleting the entry associated with the exiting groupwriter client process.

All other events are handled in block 1960.

Figure 20:
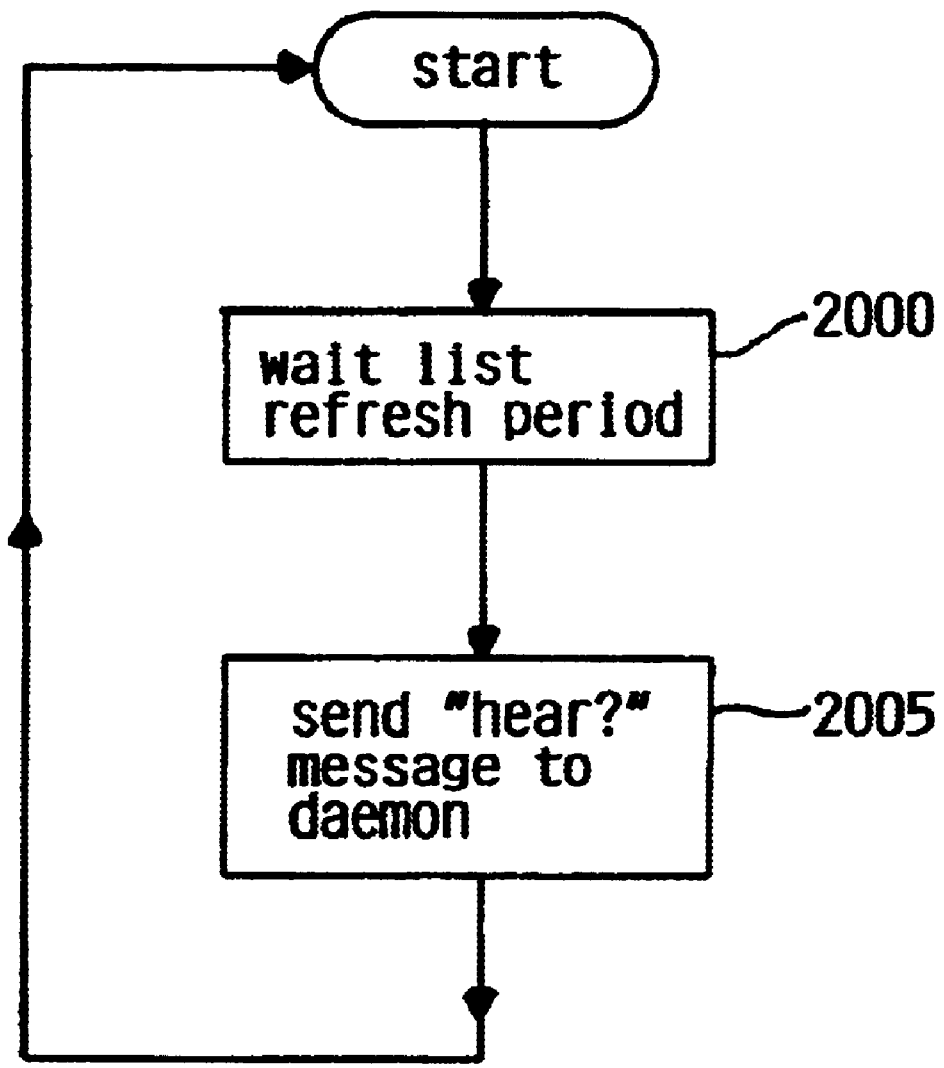
FIG. 20 is a diagram that shows the hear-list refresher that is used in the preferred embodiment of the present invention.

FIG. 20 is a diagram that shows the steps used to carry out hear-list refresher 354 of the preferred embodiment. Hear-list refresher 354 is one of the processes that are started in block 1635 of join requester 344. This process is responsible for periodically sending out hear? messages so that its user list can be refreshed periodically. Please refer to description of blocks 1902, 1904, 1906, 1908, and 1910 for an explanation of how hear?, hear, and not hear messages are handled be the preferred embodiment of the present invention.

Figure 21A:
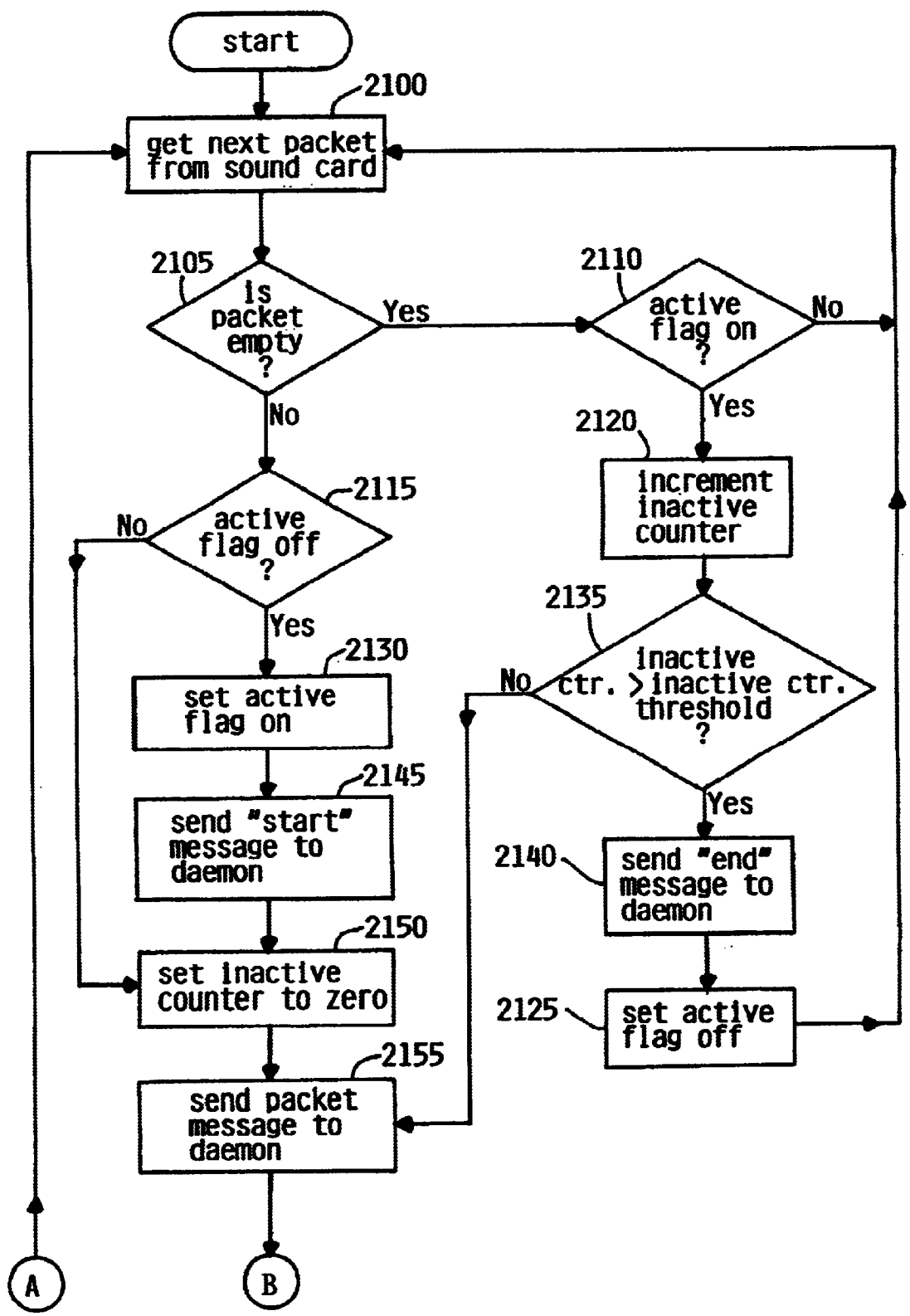
FIG. 21 is a diagram that shows the voice output controller that is used in the preferred embodiment of the present invention.
Figure 21B:
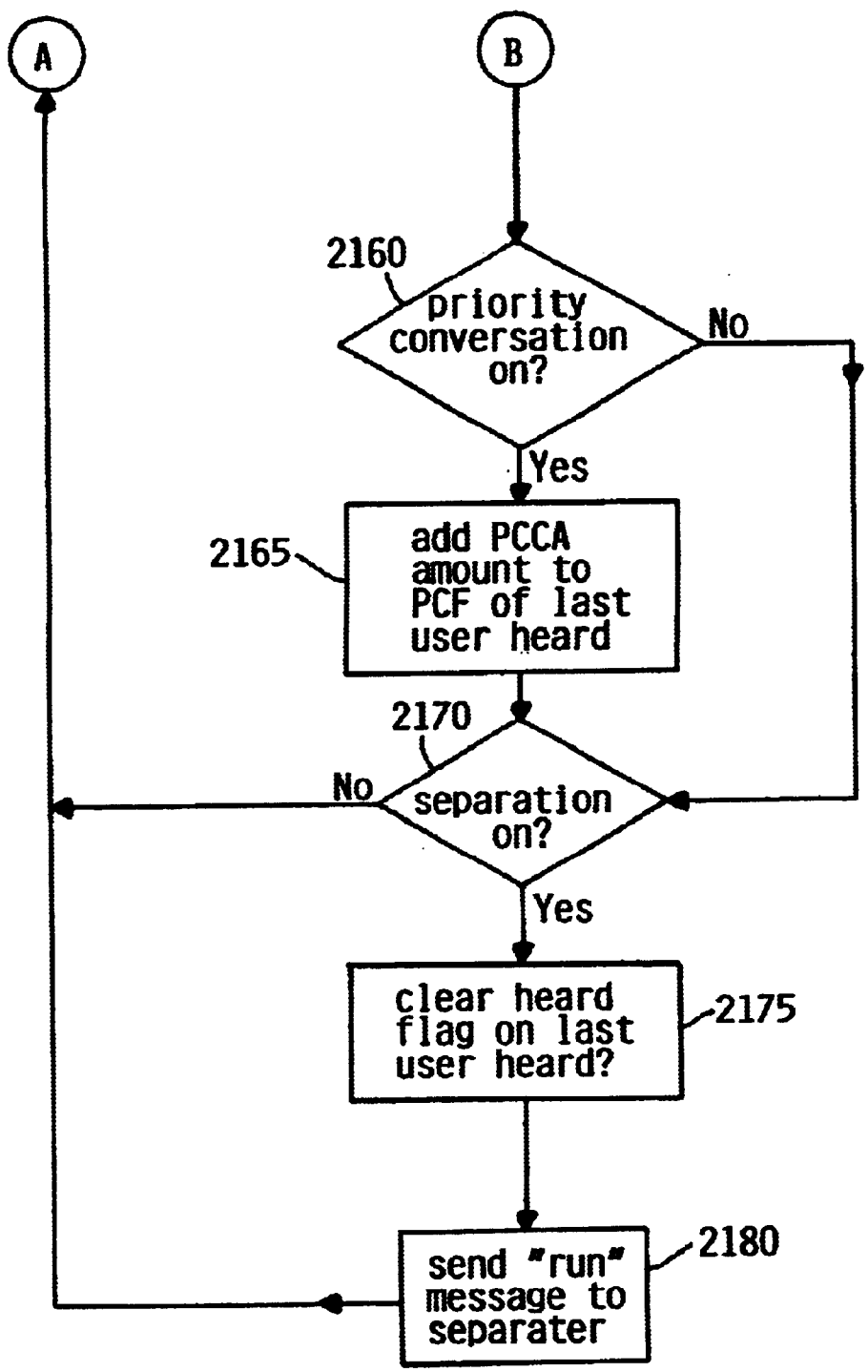

FIG. 21 is a diagram that shows the steps used to carry out voice output controller 348 of the present invention. Voice output controller 348 is another of the processes that are started in block 1635 of join requester 344. Generally speaking voice output controller 348 is responsible for retrieving voice packets from sound card 362 and packaging them into voice messages. The packets that make up voice messages are sent to the object controller, which relays them to the voice port of all of the participating groupwriter client processes. These packets are pulled off the voice port by the voice input controller of the receiving groupwriter client processes. Empty packets that are retrieved from the sound card by the voice output controller indicate pauses in the user's speech. As will be described, a series of pauses is used to delineate the continual flow of packets into voice messages.

Voice output controller 348 is also responsible for performing the initial processing of the priority conversation and conversation separation facilities. The information stored in this initial processing is then used by the groupwriter client process' voice input controller when packets are received from other groupwriter client processes.

In more detail, voice output controller 348 retrieves the next packet from sound card 362 [block 2100] and ascertains whether the packet is empty [block 2105]. If so, voice output controller 348 checks whether active flag 607 in client control block 600 is set [block 2110]. An active flag that is set indicates that a voice message is already in the process of being sent, while an active flag that is not set indicates that there is currently no voice message being sent. If the active flag is not set, voice output controller 348 returns to block 2100 to retrieve the next packet. If the active flag is set (i.e., a voice message is in progress), inactive counter 611 is incremented [block 2120] and tested against inactive counter threshold 609 [block 2135]. If the inactive counter threshold is exceeded, voice output controller 348 determines that the subject voice message is completed and sends an "end" message (see FIG. 7C) to the object controller for distribution to the other groupwriter client processes [block 2140]. After the end message has been sent, voice output controller 348 resets the active flag [block 2125] and returns to block 210 to retrieve the next packet from sound card 362.

If the inactive counter threshold has not been exceeded [block 2135], the empty packet is sent to the object controller for distribution to the other groupwriter client processes [block 2155].

Returning to block 2105. If the packet is not empty, voice output controller 348 checks the active flag in block 2115. If the active flag is not set, voice output controller 348 sets the active flag [block 2130] and signals the beginning of a voice message by sending a "start" message (see FIG. 7C) to the object controller [block 2145]. Irrespective of whether the voice output controller 348 determines that the active flag was set in block 2115, voice output controller will eventually set the inactive counter to zero [block 2150] and send the packet to the output controller [block 2155].

After the packet has been sent to the output controller in block 2155, voice output controller 348 determines whether the user has enabled the priority conversation facility (i.e., by reference to priority conversation flag 625 within client control block 600 of FIG. 6A) [block 2160]. If so, voice output controller adds the priority conversation compensation amount to the priority conversation factor of the last user heard [block 2165]. As described earlier, the priority conversation facility maintains ongoing conversation irrespective of the distance between participants, so long as the conversation continues. While the priority conversation feature is explained in further detail in the text associated with FIG. 23, the effect is basically accomplished by reducing the distance by an amount equal to the priority conversation factor, thereby causing the packet to be played based on a distance that is less than the actual distance between the users. Here, though, the priority conversation factor of the last user heard is continually increased in recognition of the fact that the user of the subject groupwriter client process is likely to be responding to the last user head. As will be seen in the discussion of FIG. 23, the last user heard is stored in the client control block by voice input controller 346.

After the priority conversations steps have been performed (i.e., blocks 2160 and perhaps 2165), voice output controller 348 next checks whether the user has enabled the conversation separation facility [block 2170]. This is accomplished through reference to conversation separation flag 627 within client control block 600. If so, the heard flag (i.e., heard flag 610 of USCI shown on FIG. 6A) is reset [block 2175] and a "run" message (see FIG. 7C) is sent to separator 352 [block 2180]. Regardless of whether the conversation separation flag is set, voice output controller 348 eventually returns to block 2100 to retrieve the next packet from sound card 362. Note here that the preferred embodiment uses two processes, one for voice output controller 348 and one for separator 352. This is done to off-load processing from voice output controller 348 to increase the frequency with which it can retrieve packets from sound card 362. Those skilled in the art will recognize that there are other design choices that could be made within the spirit and scope of the present invention.

Figure 22:
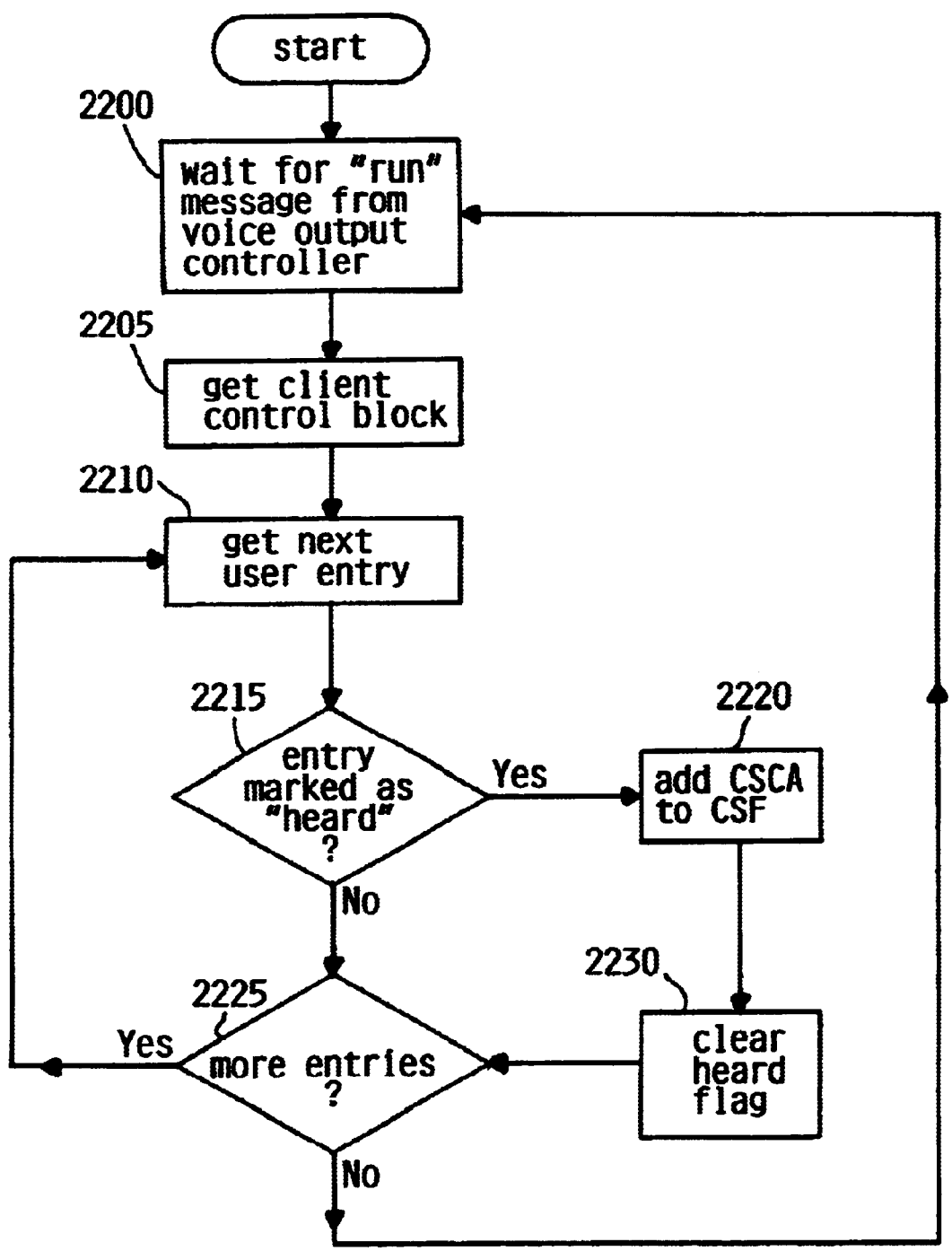
FIG. 22 is a diagram that shows the separator that is used in the preferred embodiment of the present invention.

FIG. 22 is a diagram that shows the steps used to carry out separator 352 of the preferred embodiment. Separator 352 waits for a run message from voice output controller 348 in block 2200. When a run message is received, separator 352 responds by retrieving its client control block (i.e., the client control block associated with the subject groupwriter client process) [block 2205] and proceeds to check the status of the heard flag in each user entry [blocks 2210, 2215, and 2225]. If the heard flag is set [block 2215], separator 352 adds the conversation separation compensation amount (see client control block 600 of FIG. 6A) to the conversation separation factor for the subject entry. The conversation separation factor is used within voice input controller 346 to perform part of the processing of the conversation separation facility. As will be seen in the description of FIG. 23, however, the conversation separation factor is added to the distance (i.e., instead of subtracted as in the case of the PCF), thereby causing the packet to be played based on a distance that is greater than the actual distance between users. Once the CSCA has been added to the CSF, the heard flag in the subject entry is cleared [block 2230] to prevent further adjustment to the packets of a user that has not spoken since their last packet was marked as heard.

Figure 23A:
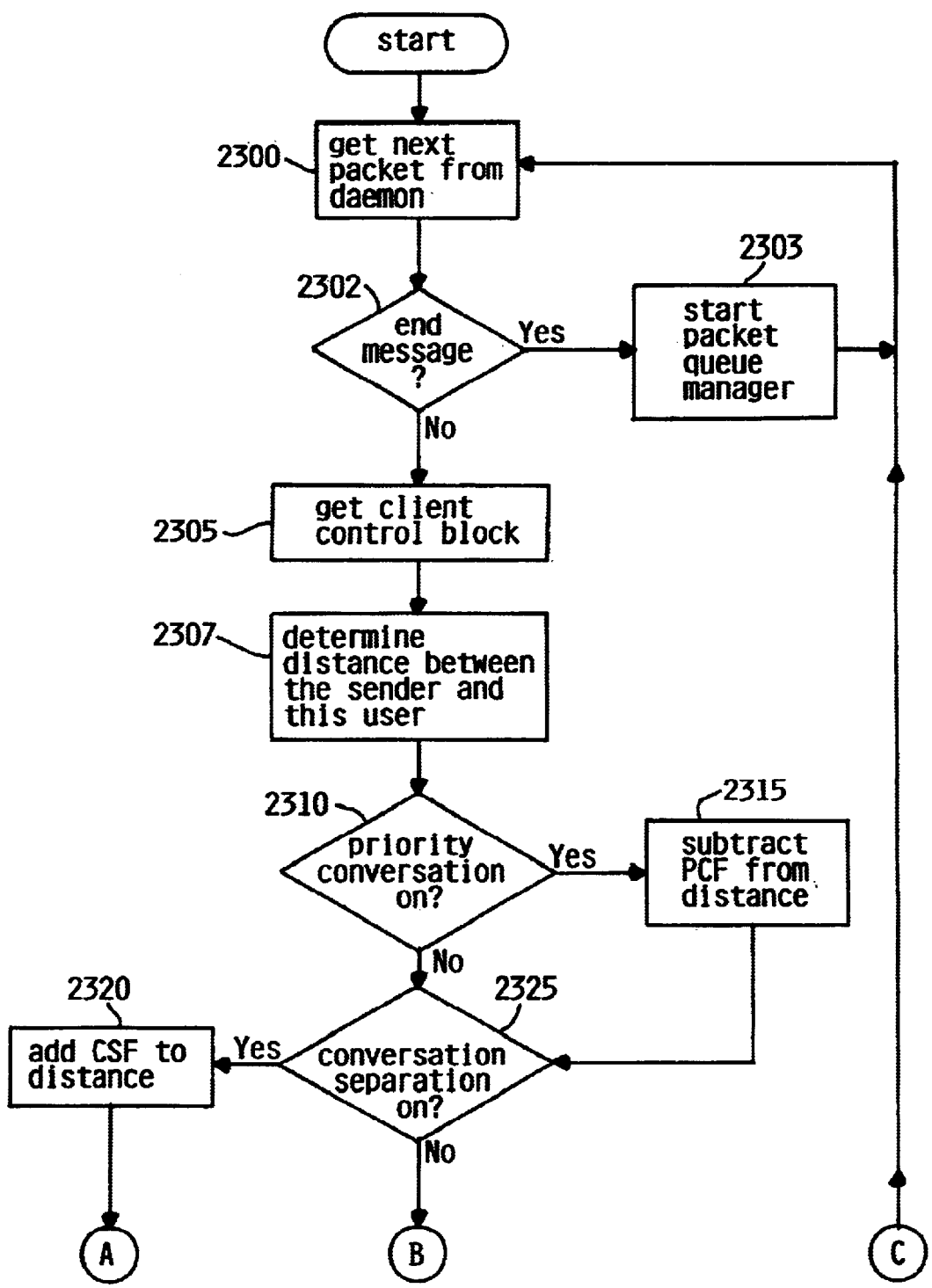
FIG. 23 is a diagram that shows the voice input controller that is used in the preferred embodiment of the present invention.
Figure 23B:
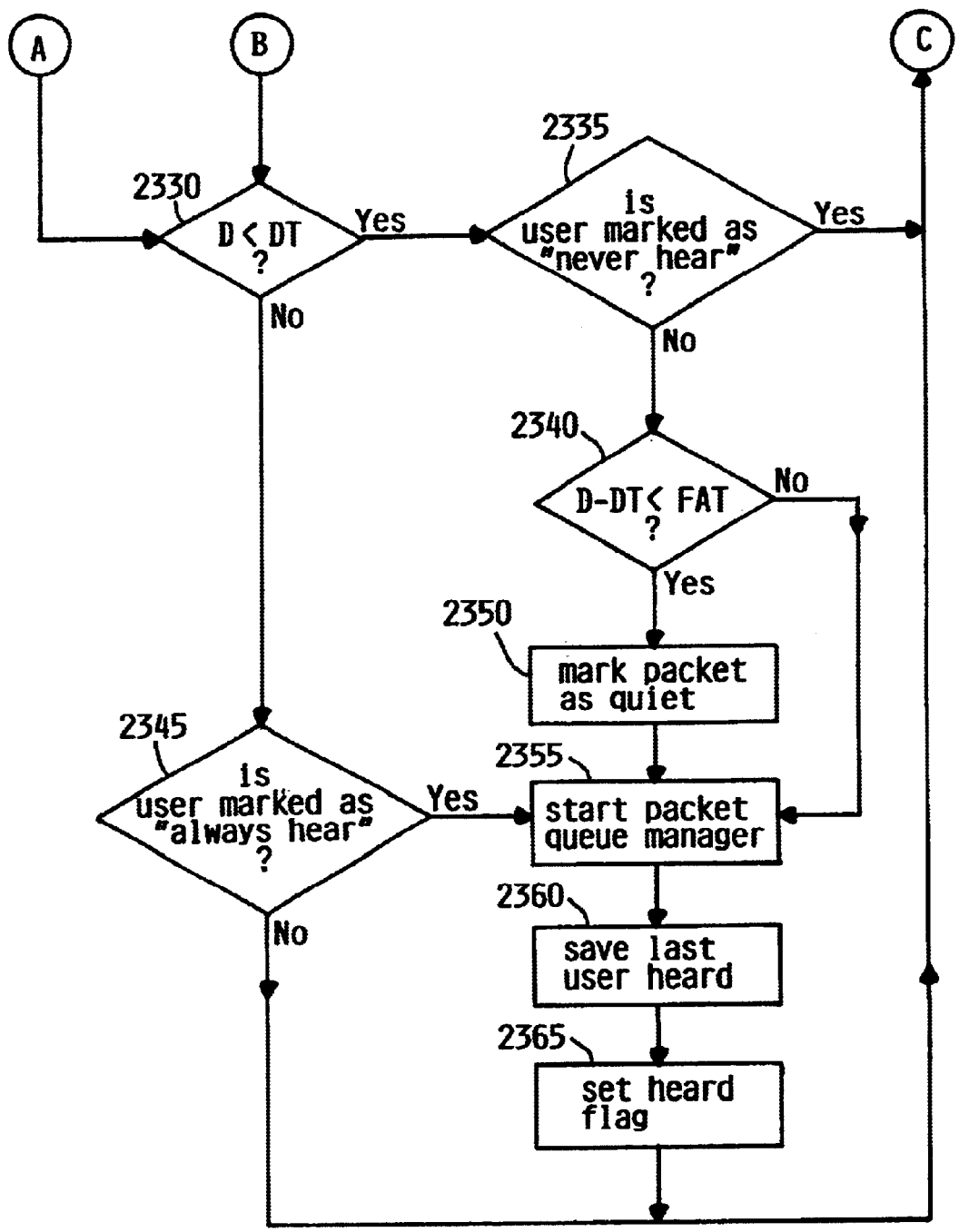

FIG. 23 is a diagram that show steps used in the preferred embodiment to carry out voice input controller 346 of the present invention. Voice input controller 346 is another of the processes that are started in block 1635 of join requester 344. Voice input controller 346 is the counterpart to voice output controller 348. Voice packets that are sent by a particular groupwriter client process' voice output controller are received and processed by each voice input controller of the other groupwriter client processes.

Once started, voice input controller 346 continually cycles to retrieve voice packets from the voice port of its groupwriter client process [block 2300]. Voice input controller 346 first determines whether the retrieved packet is an "end" message [block 2302]. If so, voice input controller 346 starts packet queue manager 356, passes the end message to packet queue manager 356 [block 2303], and returns to block 2300 to begin processing the next packet.

If the packet is not an end message, voice input controller 346 retrieves the client control block [block 2305] and calculates the distance between its user's location and that of the sending user [block 2307]. (Note here that object 150 is characterized in terms of pages and lines, which means that distance D is calculated on that basis. However, it should be understood that the scope of the present invention is not limited to this or any other distance calculation methodology.) In block 2310, voice input controller 346 retrieves the sending user's entry from the client control block and checks the control block to determine whether priority conversation has been turned on. If so, the entry's PCF value is subtracted from the distance [block 2315], which will cause the packet to be played based on a distance that is less than the actual distance between the users. Either way, voice output controller 346 will check whether conversation separation has been enabled [block 2325] and add the entry's CSF value to the distance [block 2320] when conversation separation has been enabled.

Once the priority conversation and conversation separation logic has been processed, voice input controller 346 makes the fundamental decision on whether the packet should be played [block 2330]. If the calculated distance, which may have been adjusted for priority conversation and/or conversation separation, is greater than the distance threshold, the packet is not played unless the user's entry is marked as "always hear" (i.e., through reference to always hear flag 604 of FIG. 6) [block 2345]. If the calculated distance, which again may have been adjusted for priority conversation and/or conversation separation, is less than the distance threshold, the packet is played unless the user's entry is marked as "never hear" (i.e., through reference to never hear flag 602 of FIG. 6B) [block 2335].

Part of the processing of the quiet packet facility occurs in blocks 2340 and 2345, where the difference between the distance between users and the distance threshold is to determine whether the packet should be marked as quiet.

At this stage in its processing, voice input controller 346 passes the packet to packet queue manager 356 [block 2355], saves the current control block entry as the last user heard [block 2360], sets the heard flag within the entry [block 2365], and returns to block 2300 to begin processing the next packet.

Figure 24:
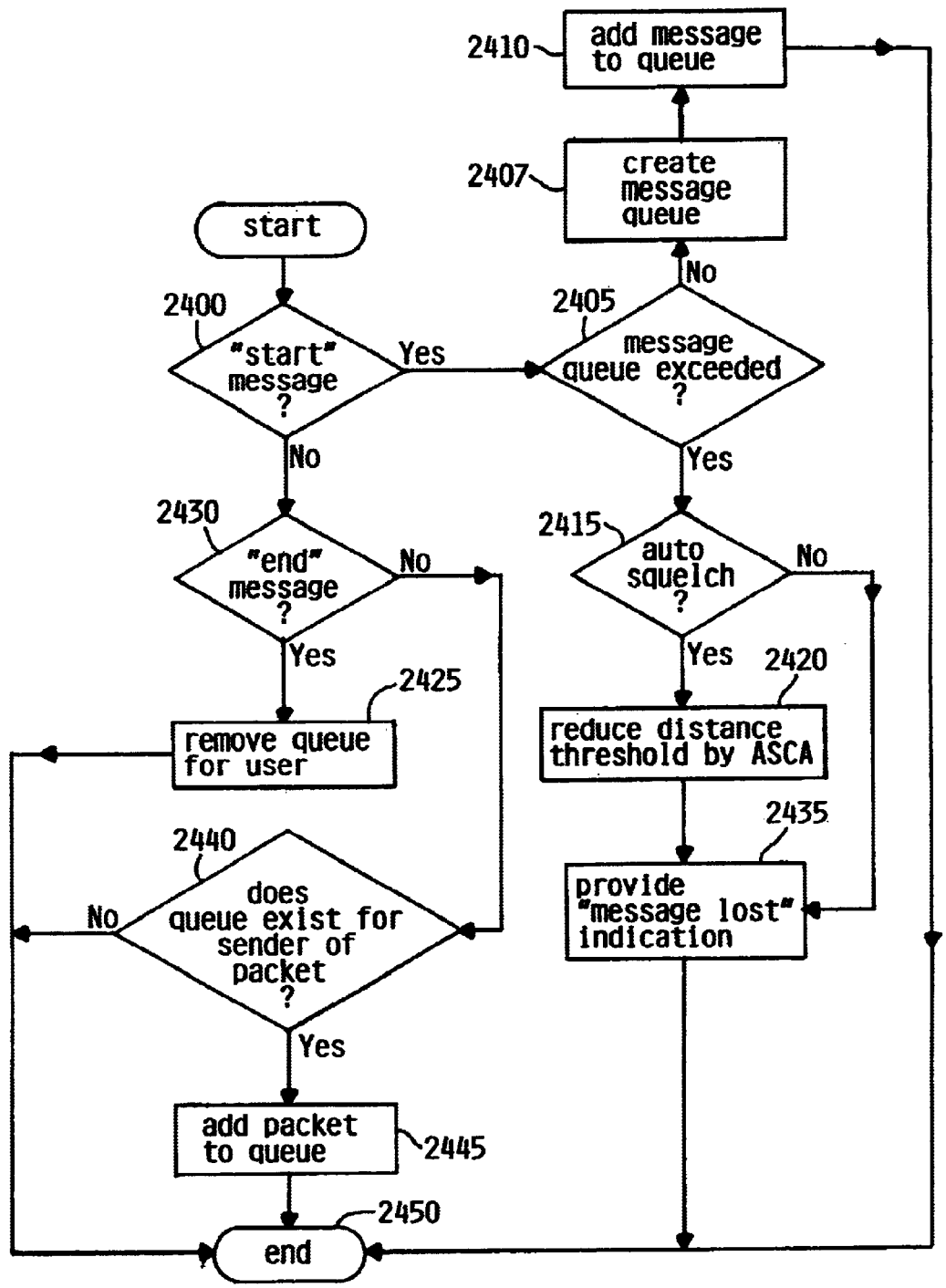
FIG. 24 is a diagram that shows the packet queue manager that is used in the preferred embodiment of the present invention.

FIG. 24 is a diagram that shows the steps used to carry out the processing of packet queue manager 356. Packet queues are created on a per user, per voice message basis. That is, one for every user that is currently sending (subject to client-based and user-based adjustments) a voice message to the groupwriter client process at issue. As its name suggests, packet queue manager 356 is responsible for creating, deleting, and otherwise managing voice packet queues. Packet queue manager 356 starts its processing in block 2400, where it determines whether the packet it received from voice input controller is a start message, which, as mentioned, signals the beginning of a voice message (i.e., as described, a series of voice packets from the same user). If the received packet is a start message, packet queue manager 356 checks whether the message queue limit (i.e., the permissible number of queue) has been exceeded. If not, packet queue manager 356 creates a queue for the sending user [block 2407], adds the message to the newly created queue [block 2410], and ends its processing in block 2450.

The message queue limit of block 2405 is used to determine whether there are too many voice packets that are scheduled to be played. Too many packet queues means that there is more voice traffic than a reasonable user could understand. Said another way, too many packet queues means that too many users are talking at once. If the message queue limit has been exceeded [block 2405], packet queue manager 356 consults auto squelch flag 629 to determine whether the user has enabled the auto squelch facility [block 2415]. As mentioned, the auto squelch facility is used to limit the number of participants in a conversation in any effort to limit conversations to a reasonable number of participants or at least to a reasonable number of participants that are actively participating in a conversation. [For claim purposes, this limit is said to be a conversation limit. It should be understood that while the preferred embodiment considers the number of packets queues when deciding whether the conversation limit has been exceeded, there are other ways of making the decision (e.g., based on overall packet traffic) that fall within the spirit and scope of the present invention.] If the auto squelch facility is enabled, the distance threshold is reduced by the auto squelch compensation amount contained in the control block of the receiving groupwriter client process [block 2420]. The reader can see through reference to the explanation of block 2330 of FIG. 23 that reduction of the distance threshold has the effect of limiting the number of packets that make it through to packet queue manager 356. After the auto squelch processing has completed, packet queue manager 356 provides an indication to the user that a packet was lost [block 2435] and ends its processing in block 2450. Those skilled in the art will appreciate that the particular means used to present the indication of block 2435 is not important to the present invention.

Returning to block 2400; packet queue manager 356 may determine that the received packet was not a start message. If so, packet queue manager 356 next determines whether the received packed is an "end" message [block 2430]. If so, packet queue manager 356 removes the queue [block 2425] and ends its processing in block 2450. If the received packet is not an end message, packet queue manager checks whether a packet queue for the sending user exists in block 2440. If a queue does exist, the message is added to the queue [block 2445] before processing ends in block 2450. If a queue does not exist, the packet is simply discarded. It should be noted that a packet could get this far without having an assigned queue if its start message had been "squelched" out because of auto squelch processing.

Figure 25A:
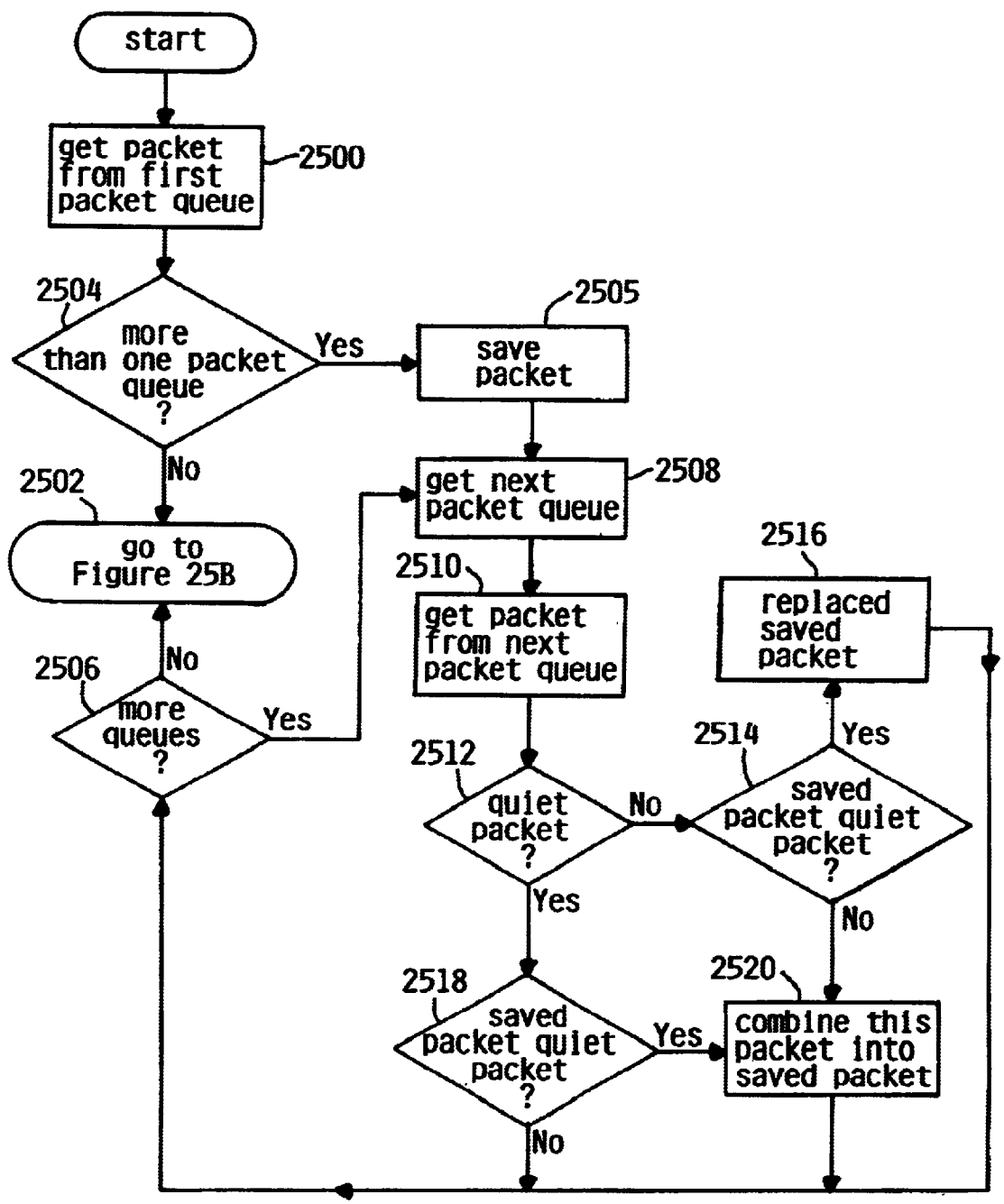
FIGS. 25A and 25B are diagrams that show the voice packet player that is used in the preferred embodiment of the present invention.
Figure 25B:
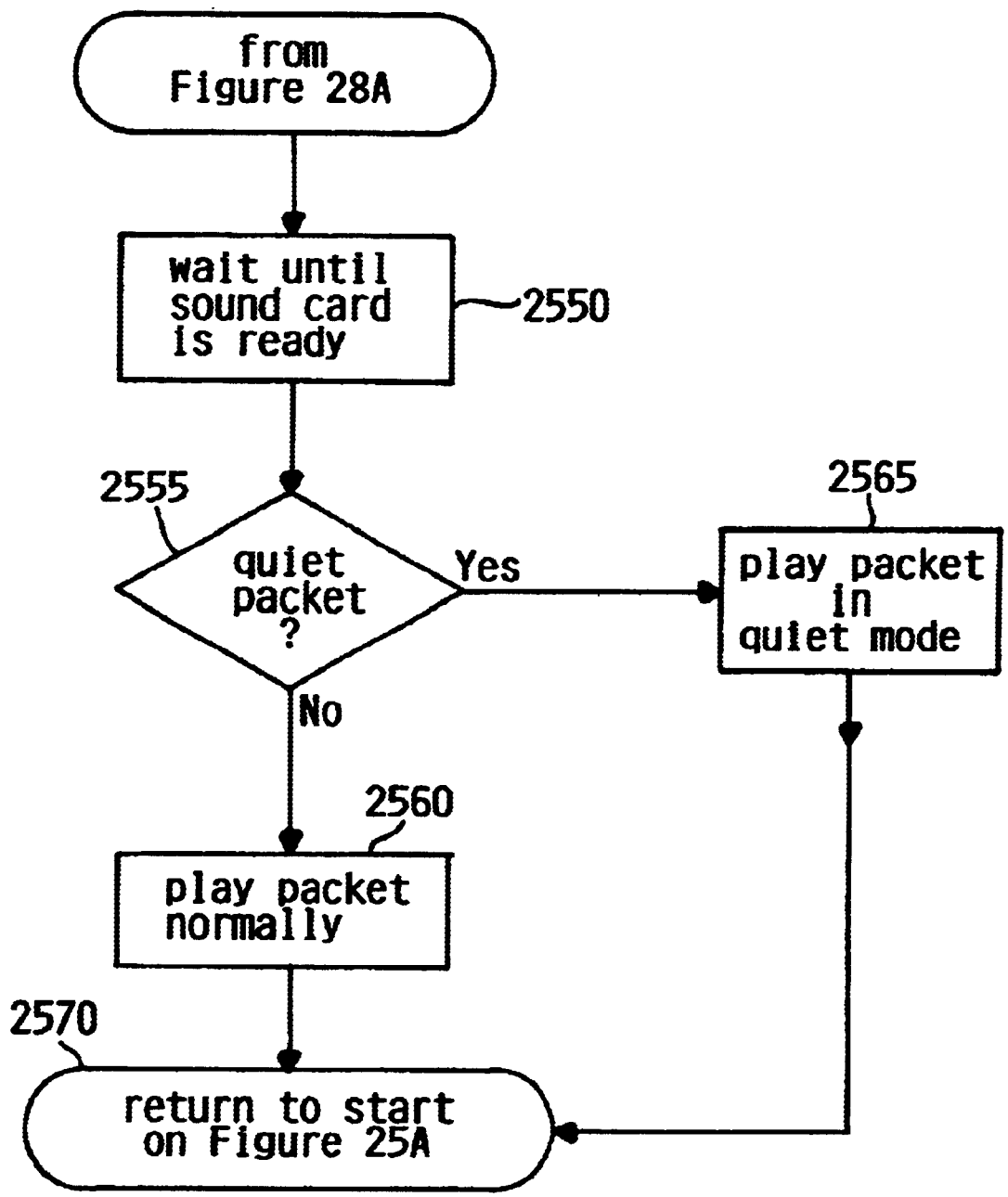

FIG. 25A is a diagram that shows the steps used carry out the processing of voice packet player 357 of the preferred embodiment. Voice packet player 357, which can be thought of as a sound card driver, is responsible for providing voice packets to sound card 362. Multiple users talking causes generation of multiple voice messages, which as mentioned earlier are represented by queues that are constructed on a one user, one voice message basis. Therefore, when there is more than one active packet queue, there is more than one user talking at the same time. In this situation, voice packet player 357 combines one packet from each queue (i.e., from each user) as a way of closely approximating real life.

Voice packet player 357 begins processing in block 2500, where it retrieves a packet from the first packet queue. Voice packet player 357 then determines whether there is more than one active packet queue (i.e., as created by packet queue manager 356) [block 2504]. If so, voice packet player 357, saves the retrieved packet [block 2505], gets the next packet queue [block 2508], retrieves a packet from that queue [block 2510], and determines whether this last packet is a quiet packet (i.e., as marked in block 2350 of FIG. 23) [block 2512]. If both packets are quiet packets [block 2518], they are combined into a single packet and saved into the saved packet [block 2520]. The saved packet then represents the sound that was generated by all of the users being heard at that instant of time, or at least at this stage all the users whose packet queues have been processed by voice packet player 357. Note also that the combined packet retains its marking as a quiet packet. If so, voice packet player 357 determines whether the saved packet is also a quiet packet [2518].

If the saved packet is not a quiet packet, the quiet packet is simply discarded, and processing continues in block 2506. The quiet packet is discarded at this point in processing because its effect on the overall representation of the sound is minimal, while its potential for effect on the sound quality (i.e., through the introduction of noise) is somewhat higher. Those skilled in the art, however, will recognize that other design choices are possible. One example might be to simply combine all packets irrespective of whether this might cause the combination of quiet packets with normal volume packets.

Returning to block 2512. If the packet is not a quiet packet, voice packet player 357 determines whether the saved packet is a quiet packet [block 2514]. If not (i.e., if they are both the same), the two packets are combined (as before) in block 2520. If the saved packet is a quiet packet, it is replaced with the new packet [block 2526] because, as mentioned above, a combination such as this does can negatively effect overall sound quality.

Voice packet player 357 continues to iterate over blocks 2506 through 2520 until one packet has been processed from each packet queue. When all of the queues have been processed [block 2506], voice packet player proceeds to present the packet to sound card 362 so that it can be played by to the user. These steps are shown on FIG. 25B. In block 2550, voice packet player 357 waits for sound card 362 to be ready to receive the voice packet. When sound card 362 is ready, voice packet player 357 determines whether the packet is a quiet packet [block 2555]. If so, voice packet player 357 instructs sound card 362 to play the packet in quiet mode (i.e., at a volume that is quieter than normal). If the packet is not a quiet packet, sound card 362 is just given the packet to play at normal volume [block 2560]. Note here that the packet that is played may be a single packet (i.e., if there is only one active packet queue) or it may be two or more packets combined into one (i.e., if there is more than one active packet queue).

Once the packet has been presented to sound card 362, voice packet player 357 returns to block 2500 (of FIG. 25A) to continue its processing [block 2570].

Figure 26:
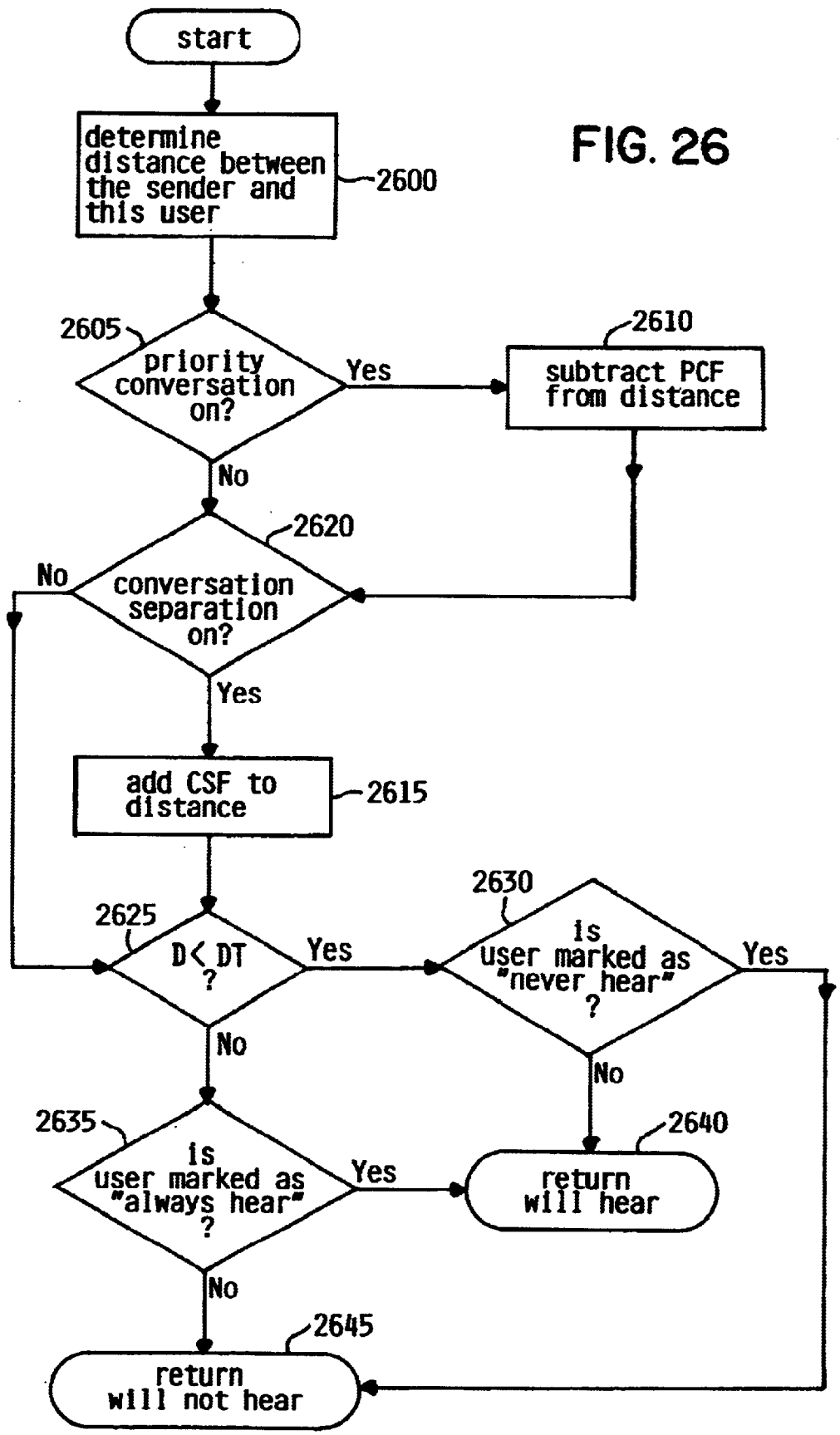
FIG. 26 is a diagram that shows the hear calculator that is used in the preferred embodiment of the present invention.

FIG. 26 is a diagram that shows the steps used to carry out the processing of hear calculator 361 of the preferred embodiment. As indicated in the discussion of FIG. 19A, hear calculator 361 is used to determine whether voice packets sent by the subject user will be heard by the other users. Hear calculator 361 is invoked in block 1904 of FIG. 19A. Once invoked, hear calculator 361 calculates the distance between its user's location and that of the sending user [block 2600]. In block 2605, hear calculator 361 retrieves the user's entry from the client control block and checks the control block to determine whether priority conversation has been turned on [block 2605]. If so, the entry's PCF value is subtracted from the distance [block 2610]. Either way, hear calculator 361 will check whether conversation separation has been enabled [block 2620] and add the entry's CSF value to the distance [block 2615] when conversation separation has been enabled.

Once the priority conversation and conversation separation logic has been processed, hear calculator 361 determines whether the packet will be heard [block 2625]. If the calculated distance is greater than the distance threshold or if the user's entry is marked as "never hear," the packet will not be heard [block 2645]. If the calculated distance, which again may have been adjusted for priority conversation and/or conversation separation, is less than the distance threshold or if the user's entry is marked as "always hear," the packet will be heard [block 2640].

Figure 27:
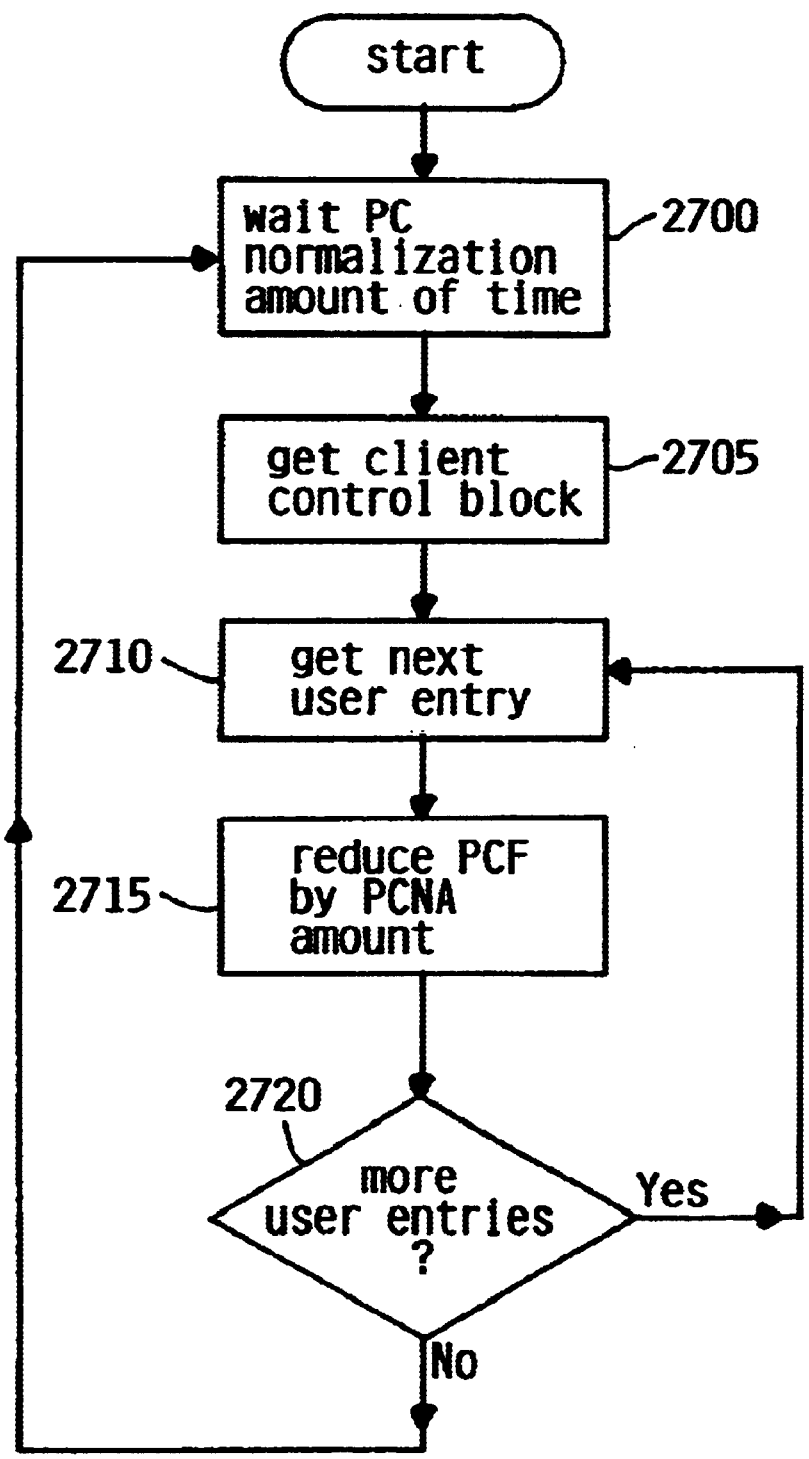
FIG. 27 is a diagram that shows the priority conversation normalizer that is used in the preferred embodiment of the present invention.
Figure 28:
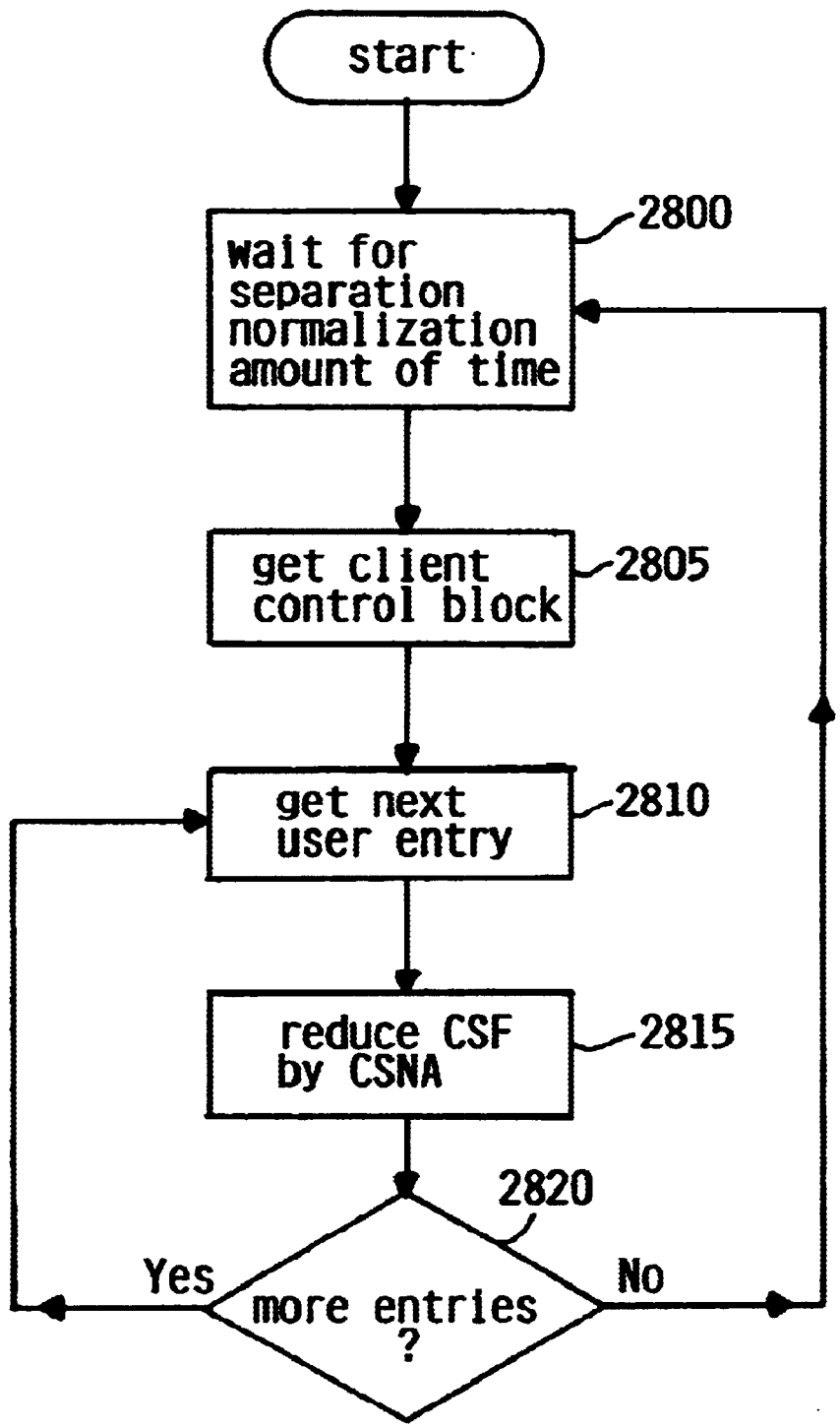
FIG. 28 is a diagram that shows the conversation separation normalizer that is used in the preferred embodiment of the present invention.
Figure 29:
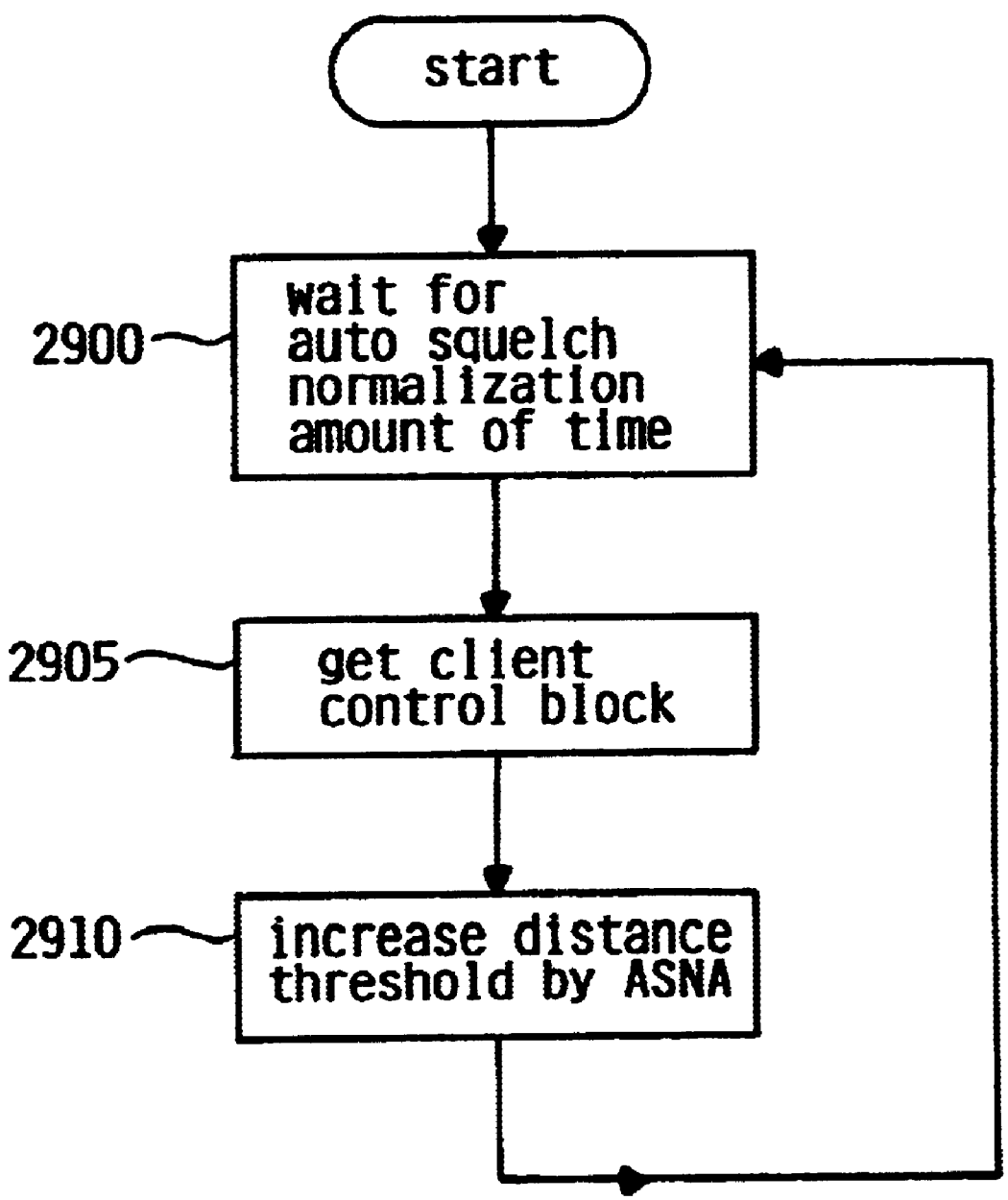
FIG. 29 is a diagram that shows the auto squelch normalizer that is used in the preferred embodiment of the present invention.

FIGS. 27 through 29 are diagrams that show the processing used to carry out the normalizers of the preferred embodiment. The priority conversation, conversation separation, and auto squelch facilities have been described in the preceding discussion. As has been explained, these facilities operate under certain circumstances to make changes to the distance and distance threshold values so as to effect what users can hear. Normalizers are background mechanisms that operate to counter these changes over a long period of time through recognition of the fact that the situations that created a need for the changes in the first instance are transitory.

FIG. 27 shows the steps used in the preferred embodiment to carry out the processing of priority conversation normalizer 351. Priority conversation normalizer 351 is another of the processes that is started in block 1635 of join requester 344. Priority conversation normalizer 351 periodically executes after waiting a specified period of time [block 2700]. The wait time is implementation dependent, and accordingly, is not specified here. Priority conversation normalizer 351 then gets the client control block [block 2705] and proceeds to iterate over each block to reduce the priority conversation factor by the priority conversation normalization amount [blocks 2710 through 2720]. Once each entry has been processed, priority conversation normalizer 361 returns to block 2700 where it waits the prescribed amount of time before processing the entries again.

FIG. 28 shows the steps used in the preferred embodiment to carry out the processing of separation normalizer 353. Separation normalizer 353 is another of the processes that is started in block 1635 of join requester 344. Separation normalizer 353 periodically executes after waiting a specified period of time [block 2800]. The wait time is implementation dependent, and accordingly, is not specified here. Separation normalizer 353 then gets the client control block [block 2805] and proceeds to iterate over each block to reduce the priority conversation factor by the priority conversation normalization amount [blocks 2810 through 2820]. Once each entry has been processed, conversation separation normalizer returns to block 2800 where it waits the prescribed amount of time before processing the entries again.

FIG. 29 shows the steps used in the preferred embodiment to carry out the processing of auto squelch normalizer 359. Auto squelch normalizer 359 is another of the processes that is started in block 1635 of join requester 344. Auto squelch normalizer 359 periodically executes after waiting a specified period of time [block 2900]. The wait time is implementation dependent, and accordingly, is not specified here. Auto squelch normalizer 359 then gets the client control block [block 2905] and increases the distance threshold by the auto squelch normalization amount [block 2910]. After block 2910, auto squelch normalizer returns to block 2900 where it waits the prescribed amount of time before repeating this processing.

Advantages

A first advantage of the present invention is that it provides control over what users are able to bear.

A second advantage of the present invention is that it provides control over what users are able to hear through the use of subconversations.

A third advantage of the present invention is that it separates a conversation into subconversations based on which users talk and respond to one another.

A fourth advantage of the present invention is that it keeps a user in a subconversation after the user has moved away (within the groupware object) from another user's location so long as the user that has moved away continues to participate in the subconversation.

A fifth advantage of the present invention is that it shows users which other users are able to hear them.

A sixth advantage of the present invention is that it allows users to explicitly control which other users are able to hear them and which users are not able to hear them.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A computer system, said computer comprising:
   a bus;
   a central processing unit;
   computer system memory, said computer system memory being connected to said central processing unit via said bus; and
   a groupware mechanism stored in said computer system memory for execution on said central processing unit, said groupware mechanism being used by two or more users to work on a groupware object that is a joint work product, said groupware mechanism including communication capability that allows said two or more users to speak with one another, said groupware mechanism controlling what each of said two or more users are able to hear based on distance between said two or more users' locations within said groupware object.

2. The computer system of claim 1 wherein said groupware mechanism prevents a first user from hearing a second user when said second user is located at a position within said groupware object that is beyond a distance threshold from said second user's position within said groupware object.

3. The computer system of claim 2 wherein said groupware mechanism allows said first user to hear said second user even though said second user is located at a position within said groupware object that is beyond a threshold distance from said second user's position within said groupware object, so long as said second user continues to participate in a conversation with said first user.

4. The computer system of claim 1 wherein said two or more users are three or more users and wherein a first user's ability to hear a second user is changed based upon how often a third user speaks.

5. The computer system of claim 1 wherein said two or more users are three or more users and wherein a first user is prevented from hearing at least one of said three or more users, said first user being one of said three or more users, said first user being prevented from hearing said at least one of said three or more users because a conversation limit has been exceeded.

6. The computer system of claim 1 wherein a first user hears a second user at a diminished volume when said second user's location within said groupware object approaches a certain distance from said first user's position within said groupware object.

7. A program product, said program product comprising:
a groupware mechanism, said groupware mechanism being used by two or more users to work on a groupware object that is a joint work product, said groupware mechanism including communication capability that allows said two or more users to speak with one another, said groupware mechanism controlling what each of said two or more users are able to hear based on distance between said two or more users' locations within said groupware object; and
signal bearing media bearing said groupware mechanism.

8. The groupware mechanism of claim 7 wherein said groupware mechanism prevents a first user from hearing a second user when said second user is located at a position within said groupware object that is beyond a distance threshold from said second user's position within said groupware object.

9. The groupware mechanism of claim 8 wherein said groupware mechanism allows said first user to hear said second user even though said second user is located at a position within said groupware object that is beyond a threshold distance from said second user's position within said groupware object, so long as said second user continues to participate in a conversation with said first user.

10. The groupware mechanism of claim 7 wherein said two or more users are three or more users and wherein a first user's ability to hear a second user is changed based upon how often a third user speaks.

11. The groupware mechanism of claim 7 wherein said two or more users are three or more users and wherein a first user is prevented from hearing at least one of said three or more users, said first user being one of said three or more users, said first user being prevented from hearing said at least one of said three or more users because a conversation limit has been exceeded.

12. The groupware mechanism of claim 7 wherein a first user hears a second user at a diminished volume when said second user's location within said groupware object approaches a certain distance from said first user's position within said groupware object.

13. The program product of claim 7 wherein said signal bearing media is communication type media.

14. The program product of claim 7 wherein said signal bearing media is recordable media.

15. A program product, said program product comprising:
a groupware mechanism, said groupware mechanism being used by a plurality of users to work on a groupware object that is a joint work product, said groupware mechanism including communication capability that allows said two or more users to speak with one another, said groupware mechanism maintaining a conversation between at least two users irrespective of distance between said at least two user's locations within said groupware object, so long as at least one of said at least two users continues to participate in said conversation; and
signal bearing media bearing said groupware mechanism.

16. The program product of claim 15 wherein said signal bearing media is communication type media.

17. The program product of claim 15 wherein said signal bearing media is recordable media.

18. A program product, said program product comprising:
a groupware mechanism, said groupware mechanism being used by a first, a second, and a third user to work on a groupware object that is a joint work product, said groupware mechanism including communication capability that allows said first, second, and third users to speak with one another, and wherein said first user's ability to hear said second user is changed based upon how often said third user speaks; and
signal bearing media bearing said groupware mechanism.

19. The program product of claim 18 wherein said signal bearing media is communication type media.

20. The program product of claim 18 wherein said signal bearing media is recordable media.

21. A program product, said program product comprising:
a groupware mechanism, said groupware mechanism being used by a first, a second, and a third user to work on a groupware object that is a joint work product, said groupware mechanism including communication capability that allows said first, second, and third users to speak with one another, and wherein said first user's ability to hear said second user is changed because a conversation limit has been exceeded; and
signal bearing media bearing said groupware mechanism.

22. The program product of claim 21 wherein said signal bearing media is communication type media.

23. The program product of claim 21 wherein said signal bearing media is recordable media.

24. A computer-implemented method for controlling a conversation between collaborative users that are working on a groupware object that is a joint work product, said computer-implemented method comprising:
monitoring a first position of a first user within said groupware object and a second position of a second user within said groupware object, said first user and said second users each being one of said collaborative users;
calculating a distance between said first position and said second position; and
affecting whether said first user is able to hear said second user based on said distance.

25. The computer-implemented method of claim 24 wherein said conversation is maintained irrespective of said distance calculated in said calculating step.

26. The computer-implemented method of claim 24 further comprising the step of preventing said first user from hearing said second user because a third user is speaking, said third user being one of said collaborative users.

27. The computer-implemented method of claim 24 further comprising the step of preventing said first user from hearing a third user because a conversation limit has been exceeded, said third user being one of said collaborative users.

28. A program product, said program product comprising:
a groupware mechanism, said groupware mechanism being used by two or more users to simultaneously work on a groupware object that is a joint work product, said groupware mechanism including communication capability that allows said two or more users to speak with one another, said groupware mechanism allowing at least one of said two or more users to control whether at least one other user is able to hear them; and
signal bearing media bearing said groupware mechanism.

29. The program product of claim 28 wherein said signal bearing media is communication type media.

30. The program product of claim 28 wherein said signal bearing media is recordable media.

31. A program product, said program product comprising:
a groupware mechanism, said groupware mechanism being used by two or more users to work on a groupware object that is a joint work product, said groupware mechanism including communication capability that allows said two or more users to speak with one another, said groupware mechanism allowing at least one of said two or more users to control whether they are able to hear at least one other user; and
signal bearing media bearing said groupware mechanism.

32. The program product of claim 31 wherein said signal bearing media is communication type media.

33. The program product of claim 31 wherein said signal bearing media is recordable media.

34. A program product, said program product comprising:
a groupware mechanism, said groupware mechanism being used by a plurality of users to simultaneously work on a groupware object that is a joint work product, said groupware mechanism including communication capability that allows said plurality of users to speak with one another, said groupware mechanism being used to create subconversations amongst said plurality of users such that at least one subset of said plurality of users is allowed to engage in a conversation that is separate from that of the remaining users of said plurality of users; and
signal bearing media bearing said groupware mechanism.

35. The program product of claim 34 wherein said signal bearing media is communication type media.

36. The program product of claim 34 wherein said signal bearing media is recordable media.

37. A program product, said program product comprising:
a groupware mechanism, said groupware mechanism being used by a plurality of users to simultaneously work on a groupware object that is a joint work product, said groupware mechanism including communication capability that allows said plurality of users to speak with one another, said groupware mechanism including a mechanism that identifies what users are able to hear said first user, said first user being one of said plurality of users; and
signal bearing media bearing said groupware mechanism.

38. The program product of claim 37 wherein said signal bearing media is communication type media.

39. The program product of claim 37 wherein said signal bearing media is recordable media.

\* \* \* \* \*